(12) United States Patent
Gaertner et al.

(10) Patent No.: US 12,345,721 B2
(45) Date of Patent: Jul. 1, 2025

(54) AUTOMATED SLIDE PROCESSING SYSTEMS, CONSUMABLE STAINER UNITS, AND RELATED TECHNOLOGIES

(71) Applicant: Ventana Medical Systems, Inc., Tucson, AZ (US)

(72) Inventors: Claudia Gaertner, Jena (DE); Holger Becker, Jena (DE)

(73) Assignee: Ventana Medical Systems, Inc., Tucson, AZ (US)

( * ) Notice: Subject to any disclaimer, the term of this patent is extended or adjusted under 35 U.S.C. 154(b) by 381 days.

(21) Appl. No.: 17/151,053

(22) Filed: Jan. 15, 2021

(65) Prior Publication Data

US 2021/0172968 A1    Jun. 10, 2021

Related U.S. Application Data

(63) Continuation of application No. PCT/EP2019/068809, filed on Jul. 12, 2019.
(Continued)

(51) Int. Cl.
*G01N 35/00* (2006.01)
*B01L 3/00* (2006.01)
(Continued)

(52) U.S. Cl.
CPC .... *G01N 35/00029* (2013.01); *B01L 3/50273* (2013.01); *B01L 9/52* (2013.01);
(Continued)

(58) Field of Classification Search
CPC ............. G01N 35/00029; G01N 1/312; G01N 35/1002; G01N 2035/00346;
(Continued)

(56) References Cited

U.S. PATENT DOCUMENTS 6,849,457 B1   2/2005  Babson et al.
7,998,708 B2 * 8/2011  Handique ........... F16K 99/0044
                                                435/6.1
(Continued)

FOREIGN PATENT DOCUMENTS

WO    2005016532    2/2005
WO    2017081115    5/2017
(Continued)

OTHER PUBLICATIONS

International Search Report and Written Opinion for PCT/EP2019/68809, Filed Jul. 12, 2019.
(Continued)

*Primary Examiner* — Paul S Hyun
*Assistant Examiner* — Tingchen Shi
(74) *Attorney, Agent, or Firm* — Perkins Coie LLP

(57) ABSTRACT

Systems and methods that enable automated processing of specimens carried on microscope slides are described herein. Aspects of the technology are directed, for example, to an automated staining system that includes an instrument including an end effector and a stainer unit-receiving station that receives a stainer unit such that the end effector delivers reagent from the reagent reservoirs to a reaction chamber of the slide stainer unit. The stainer unit can carry fresh reagents, waste material, and components used to handle the reagents.

25 Claims, 16 Drawing Sheets

Related U.S. Application Data

(60) Provisional application No. 62/698,802, filed on Jul. 16, 2018.

(51) Int. Cl.
 B01L 9/00 (2006.01)
 G01N 1/31 (2006.01)
 G01N 35/10 (2006.01)

(52) U.S. Cl.
 CPC ......... G01N 1/312 (2013.01); G01N 35/1002 (2013.01); G01N 35/1079 (2013.01); B01L 2200/16 (2013.01); B01L 2300/08 (2013.01); B01L 2400/0481 (2013.01); G01N 2035/00138 (2013.01); G01N 2035/00346 (2013.01)

(58) Field of Classification Search
 CPC .... B01L 3/50273; B01L 9/52; B01L 2200/16; B01L 2300/08; B01L 2400/0481
 See application file for complete search history.

(56) References Cited

U.S. PATENT DOCUMENTS

| | | | |
|---|---|---|---|
| 12,174,206 B2 | 12/2024 | O'Connor | |
| 2002/0192701 A1 | 12/2002 | Adey | |
| 2012/0177543 A1* | 7/2012 | Battrell | F04B 43/043 422/187 |
| 2015/0238959 A1 | 8/2015 | Prakash et al. | |
| 2015/0298118 A1* | 10/2015 | Chard | B01L 9/52 435/7.92 |
| 2015/0343445 A1 | 12/2015 | Bagnato | |
| 2017/0058245 A1* | 3/2017 | Shah | B01L 3/50273 |
| 2017/0328820 A1 | 11/2017 | Angros | |
| 2018/0073963 A1 | 3/2018 | Kawano et al. | |
| 2018/0193831 A1 | 7/2018 | Hopper | |
| 2021/0172967 A1 | 6/2021 | Stefano et al. | |
| 2021/0172969 A1 | 6/2021 | O'Connor | |

FOREIGN PATENT DOCUMENTS

| | | |
|---|---|---|
| WO | 2018/001767 A1 | 1/2018 |
| WO | 2020016113 | 1/2020 |
| WO | 2020016126 | 1/2020 |
| WO | 2020016127 | 1/2020 |

OTHER PUBLICATIONS

ISA: European Patent Office, PCT/EP2019/068774, filed Jul. 13, 2019, International Search Report and Written Opinion mailed: Nov. 20, 2019, 18 pages.

ISA: European Patent Office, PCT Application No. PCT/EP2019/068814, filed Jul. 12, 2019, International Search Report and Written Opinion mailed: Feb. 11, 2020, 23 pages.

* cited by examiner

AUTOMATED SLIDE PROCESSING SYSTEMS, CONSUMABLE STAINER UNITS, AND RELATED TECHNOLOGIES

CROSS-REFERENCE TO RELATED APPLICATIONS

This application is a continuation of PCT Application No. PCT/EP2019/068809, filed Jul. 12, 2019, which claims priority to U.S. Provisional Application No. 62/698,802, filed Jul. 16, 2018, which are hereby incorporated by reference in their entireties.

TECHNICAL FIELD

This disclosure relates to systems for preparing samples for analysis. In particular, the disclosure relates to automated slide processing systems, consumable stainer units, and related technologies for processing samples.

BACKGROUND

A wide variety of techniques have been developed to prepare and analyze biological specimens. Example techniques include microscopy, microarray analyses (e.g., protein and nucleic acid microarray analyses), and mass spectrometric methods. Specimens are typically prepared for analysis by applying one or more liquids (e.g., reagents) to the specimens. If a specimen is treated with multiple liquids, both the application and subsequent removal of each liquid can be important for producing stained specimens suitable for analysis. For example, microscope slides bearing biological specimens, e.g., tissue sections or cells, are often treated with a series of manually applied reagents to add color and contrast to otherwise transparent or invisible cells or cell components. This labor-intensive process often results in inconsistent processing due to individual techniques among laboratory technicians.

Automated slide processing machines are often used for high-volume slide processing. Unfortunately, conventional automated slide processing machines are typically relatively large, thus making them unsuitable for use in surgery suites and small laboratories. For example, conventional automated pipetting systems can be quite large and have pipetting heads capable of individually dispensing liquids onto specimen-bearing microscope slides held by a tray. Pipettes are used to aspirate reagents out of bottles and to dispense the reagents onto uncovered slides. The reagents are exposed to air which can lead to degradation, e.g., due to oxidation, or biologic contamination of solution components over time. This can lead to inconsistent staining unless the solutions are regularly replenished or exchanged. Replenishing or exchanging liquids can be a time-consuming and wasteful process that often disrupts work-flow. Additionally, automated pipetting systems have a limited number of reagent bottles, thus limiting the number of staining protocols that can be performed or necessitating swapping which negatively impacts workflow. Accordingly, conventional automated slide processing machines suffer various drawbacks.

SUMMARY

At least some embodiments include a staining system for preparing and analyzing biological specimens. The staining system can include a consumable stainer unit for processing microscope slides bearing biological specimens with a series of automatically applied reagents to add color stains and background contrast to otherwise transparent or invisible cells or cell components. The stainer unit can include reagent dispensing elements, a slide processing station which can control temperature, reagent removal elements, and sealed reagent holders with reagents. The stainer unit can be integrated into an instrument in a laboratory environment. In some embodiments, the stainer unit can also include containers to capture used and unused reagents for safe and convenient disposal. The stainer unit can contain the specimen slide and can prevent, limit, or minimize evaporative losses, stain degradation (e.g., due to oxidation), and minimize or eliminate the possibility of tissue cross-contamination, or other problems. Accordingly, the stainer unit can be used to control reagent characteristics (e.g., concentrations, mixtures, etc.) to enhance the effectiveness of the reagents, resulting in desired staining characteristics. In single use embodiments, the stainer unit can have enough reagent to perform a single multistep staining protocol to avoid reagent waste and can be made of relative low-cost materials. To process multiple slides, each slide can be processed with a consumable stainer unit selected from a family of consumables based on the reagents stored within them, and the staining protocol required. Manual procedures, automated procedures, or combination of manual and automated procedures can be used to process the slides.

Aspects of the technology are directed, for example, to an automated staining system having an instrument with at least one end effector and a stainer unit-receiving station. The instrument causes reagent to be delivered to the flow cell of the consumable stainer unit. The consumable stainer unit can carry fresh reagents, waste material, and components used to handle the reagents. In some embodiments, most of the fresh reagent is delivered to the flow cell to process the specimen. During processing, multiple aliquots of reagent can be delivered from the same reagent reservoir to the flow cell. All or some of the reagents contained in the consumable stainer unit may be captured in a waste container integrated into the consumable stainer unit upon completion of the specimen processing operations. For example, at least 50%, 60%, 70%, 80%, 90%, and 95% of the total volume of reagent, including fresh and used reagent, carried by the consumable stainer unit can be contained in the waste container. The waste container can include a means to allow the egress of air (e.g., to prevent back-pressure developing) and to ensure that substantially no used reagent liquid escapes from the reservoir.

In some embodiments, a staining system can include a slide processing cartridge having a flow cell, reagent reservoirs, and a waste container fluidly coupled to the flow cell. The flow cell has a slide-receiving region and a sealing ring. The slide-receiving region is dimensioned to receive a microscope slide such that the sealing ring sealingly contacts a specimen-bearing surface of the microscope slide to define a reaction chamber along the specimen-bearing surface. Reagent can be sequentially delivered from the reagent reservoirs to the flow cell in order to perform a set of slide tissue processing operations. In automated procedures, the staining system can include an instrument with an end effector and a cartridge-receiving station. The end effector is capable of engaging a dispenser of the slide processing cartridge, which is positioned at the cartridge-receiving station, in order to cause reagent to be delivered from a respective one of the reagent reservoirs to the flow cell. The instrument can be configured to use the slide processing cartridge to perform a staining protocol without contacting the reagents to reduce the frequency of instrument maintenance. In manual procedures, a user can manually operate dispensers of the slide processing cartridge. The actuators can have predetermined volumes of reagents to simplify manual operation.

The slide processing cartridge can be configured to sequentially delivery reagents from the closed reagent reservoirs to the flow cell for fluid exchange cycles and to cause the reagents to flow from the flow cell to the waste reservoir. The dispenser can be a pipette, a blister element, or a syringe element and can, for example, employ electrical actuation and/or pneumatics to provide motive forces. The specimen slide processing cartridge can include a base (e.g., a planar platform) with a fluid circuit that fluidly couples the dispensing element(s) to the flow cell and that fluidly couples the flow cell to the waste container. The fluid circuit can include one or more fluid passageways, fluid lines, valves, air-trap features, or the like.

The flow cell has an inlet region a specimen containing flow cell region and an outlet region. The inlet region can widen laterally in a downstream direction to allow liquid reagent to spread outwardly into the flow cell with minimal turbulent flow. The reaction chamber can have a substantially polygonal shape (e.g., substantially hexagonal shape or substantially rectangular shape), elliptical shape, or the like.

In some embodiments, a stainer unit for processing slides includes a support base and a flow cell connected to the support base. The flow cell can include a slide engagement region having a surface and a sealing member. The sealing member is configured to sealingly contact a specimen-bearing surface of a microscope slide to define a flow cell between the surface of the slide engagement region and the specimen-bearing surface. In some embodiments, the reaction chamber/flow cell can be sealed by one or more valves positioned along entry and exit fluid lines or passageways, and the sealing arrangement provided via the reaction chamber seals. Reagents can be held in the reaction chamber to maintain hydration of the specimen and provide a suitable target with associated marker, e.g., antibody, DNA probe, dye molecule, or the like. The stainer unit, including the sealed reaction chamber, can then be heated to temperatures higher than the boiling temperature of the reagent (e.g., a primarily water based reagent) to provide enhanced antigen retrieval or other types of processing. The flow cell area can be provided with suitable physical support on upper and lower surfaces to ensure seals are maintained even when high pressure is experienced. Such high pressures can inhibit or prevent boiling when the reagent is at temperatures equal to or higher than 100° C., 105° C., 110° C., 120° C., or 130° C. such that enhanced staining can be achieved in very short periods of time. Fresh reagent can be pumped through an open inlet valve and into the reaction chamber while used reagent is pushed through an open outlet valve. The inlet and outlet valves can be closed again to perform additional high temperature steps.

The stainer unit can also include a plurality of reagent reservoirs, which are supported by the base, and at least one dispenser. The dispenser can be configured to deliver reagent from each of the reagent reservoirs to a flow cell.

The dispenser can establish fluid communication with the flow cell to perform a staining protocol in which the microfluidic microscope slide processing cartridge contains all the reagents needed to support the staining protocol. The dispenser can include one or more pipette tips, blister elements holding reagents, sealed reagent containers, and/or actuators holding reagents. The dispenser can be coupled to or integrated with the support base. In some embodiments, reagent packs can be physically separated from the rest of the microscope slide processing cartridge.

A waste container can be supported by the base and fluidically coupled to the flow cell. The waste container receives and contains reagent from the flow chamber. In some embodiments, the waste container is detachably coupled to the support base. The waste container is sealed to hold waste reagent after it has been detached from the support base. The stainer unit can include a one-way valve that allows waste reagent to flow into the waste container, and to prevent any backflow of used reagent. The waste container can be detached from the support base while the microscope slide is positioned at the slide engagement region. In some embodiments, the waste container includes an air-egress element (e.g., a valve) that allows the egress of air to prevent or limit back-pressure and inhibits or prevents used reagent liquid from escaping from the waste container.

In some blister element embodiments, the dispensers are in the form of a first blister actuator operable to dispense a first reagent from a first one of the reagent reservoirs, a second blister actuator operable to dispense a second reagent from a second one of the reagent reservoirs, and a third actuator operable to cause a rinse solution to flow into the flow chamber. A fluid circuit can fluidly couple each of the blisters to the flow cell, and the fluid circuit can include fluid passageways in the base.

In some embodiments, the reagent reservoirs can contain reagent-filled pouches. Plungers are movable to cause a respective one of the reagent-filled pouches to release reagent. The plungers can burst the reagent-filled pouches.

In yet further embodiments, a stainer unit includes regents and a reaction cell configured to at least partially define a reaction chamber. The stainer unit can include a fluid circuit that allows the reagents to be delivered to the reaction chamber. The fluid circuit can seal the reaction cell to inhibit or prevent evaporation and/or boiling of one or more of the reagents in the reaction chamber during, for example, high-temperature processing. The fluid circuit can include one or more valves in fluid communication with the reaction chamber. The valves can be located along passageways in fluid communication with the reaction chamber. In some embodiments, the fluid circuit allows the regents to be sequentially delivered to the reaction chamber and inhibits or prevents fluid flow away from reaction chamber. The sealed reaction cell can increase a boiling point of the reagent to accelerate high-temperature antigen retrieval. The reaction chamber can be located along a specimen-bearing surface of a microscope slide or at another suitable location, and the reaction cell can be a flow cell through which reagents can flow and be held in contact with the specimen.

In further embodiments, a method includes performing a plurality of specimen processing operations on a specimen held in a flow cell at least partially defined by a mounting surface of a slide carrying the specimen. The processing can include sequentially delivering reagents from two or more reservoirs of a microscope slide cartridge to a reaction chamber of the flow cell. The used reagent can be delivered into a waste container fluidly coupled to the flow cell.

The microscope slide cartridge can carry the microscope slide while the microscope slide cartridge is removed from and/or delivered to an automated instrument. Each reagent can be delivered through a fluid circuit of the microscope slide cartridge to deliver reagent into the reaction chamber and to deliver waste reagent to waste container.

In further embodiments, a method includes processing a plurality of specimens within the same cartridge. The processing can include applying the same reagents to multiple specimens either simultaneously or sequentially.

The method can include sequentially delivering a first reagent from the first reservoir to the reaction chamber, delivering a wash liquid to the reaction chamber, and delivering a second reagent from the second reservoir to the reaction chamber. The wash liquid can remove most of the first reagent by volume from the reaction chamber prior to delivery of the second reagent. Additional alternating wash and reagent cycles can be performed.

The microscope slide cartridge can be delivered to an automated instrument while the microscope slide cartridge carries most of the reagents that are used in specimen processing operations. After performing specimen processing operations, the microscope slide cartridge can be removed from the automated instrument. The waste container can be separated from a base of the microscope slide cartridge by the user or the instrument for disposal.

In some embodiments, a significant portion or most of the reagent in one or more of the reservoirs (e.g., all of the reservoirs) is delivered to the flow cell to process the specimen. During processing, multiple aliquots of reagent can be delivered from the same reservoir to the flow cell. Most of the reagent contained in the microscope slide cartridge can be carried in the waste container upon completion of specimen processing operations. For example, most of the reagent, by weight, can be carried by the waste container. For example, at least 30%, 40%, 50%, 60%, 70%, 80%, 90%, and 95% of the total volume of reagent carried by the microscope slide cartridge is contained in the waste container.

DETAILED DESCRIPTION

Figure 1:
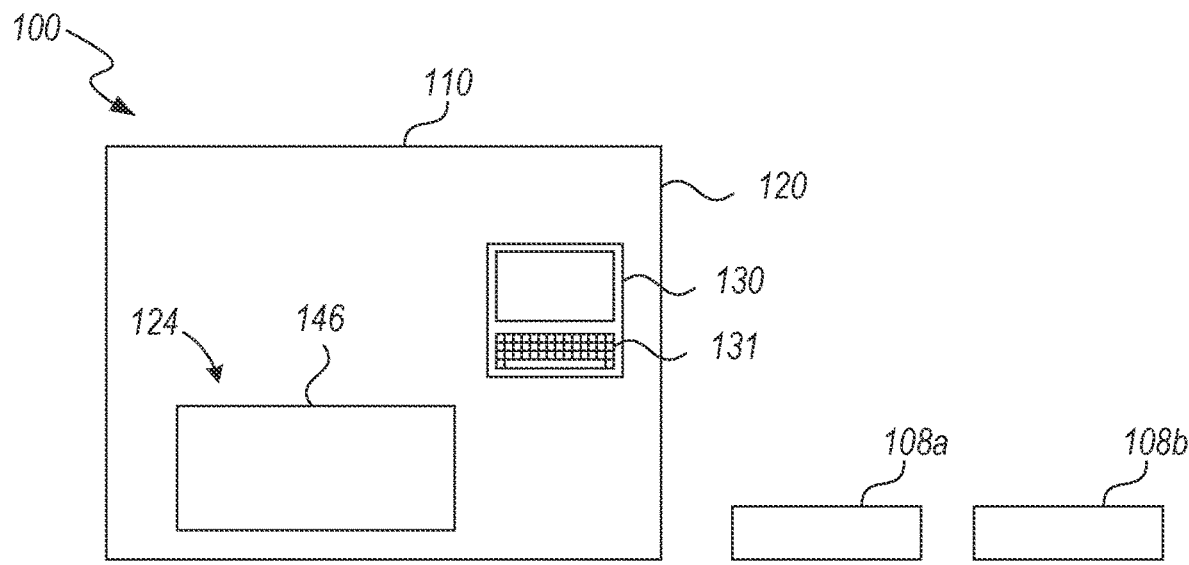
FIG. 1 is a front view of an automated specimen processing system in accordance with an embodiment of the disclosed technology.

The following description of several embodiments describes non-limiting examples of the disclosed system and methods to illustrate the technology. Furthermore, all titles and headings provided herein are for convenience only and are not intended to limit or interpret the scope or meaning of the invention. Specific details of several embodiments of the present technology are disclosed herein with reference to FIGS. 1-32. In the figures, the same reference numerals refer to like parts or acts throughout the various views, unless otherwise specified. It should be noted that other embodiments in addition to those disclosed herein are within the scope of the present technology. For example, embodiments of the present technology can have different configurations, components, substances, and/or procedures than those shown or described herein. Moreover, a person of ordinary skill in the art will understand that embodiments of the present technology can have configurations, components, substances, and/or procedures in addition to those shown or described herein and that these and other embodiments can be without several of the configurations, components, and/or procedures shown or described herein without deviating from the present technology.

I. Overview of Automated Processing Systems

FIG. 1 is a front view of an automated specimen processing system 100 ("system 100") in accordance with an embodiment of the disclosed technology. The system 100 can include a robotic staining instrument 110 and consumable stainer units 108*a*, 108*b*. The staining instrument 110 can include a protective housing 120, a loading zone or station 124 ("station 124"), and a controller 130. The station 124 can include a door or access port 146 for loading and unloading stainer units 108*a*, 108*b*, illustrated schematically, carrying specimen-bearing microscope slides. Each stainer unit 108*a*, 108*b* can contain sealed reagent reservoirs and a waste container. The staining instrument 110 can use the reagents on-board the units 108 to process the specimens. After processing, the stainer units 108*a*, 108*b* can be retrieved from the instrument 110, the specimen-bearing slides can be removed from the stainer units 108*a*, 108*b*, and the specimens can be analyzed. The system can be provided with storage capability, for example a stainer unit holding rack from which the system can access stainer units to be processed, and capable of re-inserting stainer units at various stages of assay completion.

Each stainer unit 108*a*, 108*b* (collectively "stainer units 108") can contain most or all of the substances for performing the assay, for example, specimen conditioning (e.g., cell conditioning, washing, etc.), antigen/target retrieval, staining (e.g., hematoxylin and eosin staining), or other types of protocols (e.g., immunohistochemistry protocols, in situ hybridization protocols, etc.) for preparing specimens for visual inspection, fluorescent visualization, microscopy, microanalyses, mass spectrometric methods, imaging (e.g., digital imaging), or other analytical or imaging methods. The fluids can be held in airtight containers to minimize or limit the possibility of reagent oxidation that could impact staining even when the stainer unit is stored for relatively long periods of time (e.g., months or years). The single doses also limit thermal exposure to other stored reagents when taken out of temperature controlled environments (e.g., when removed from a refrigerator). The stainer units 108 can include a reaction chamber and fluid lines, channels, valves, ports, pressurization devices (e.g., pumps, syringes, etc.), or other components for fluidly communicating with the reaction chamber. The stainer units 108 can also include one or more mixing components (e.g., mixing wells, reagent trays, etc.) for mixing reagents in, for example, lyophilized and/or liquid form. The configuration of the stainer unit and onboard substances can be selected based upon the staining protocol to be performed and functionality of the staining instrument 110.

Multiple stainer units can be available to perform different protocols. For example, the stainer unit 108*a* can have reagents for performing hematoxylin and eosin (H&E) staining and the stainer unit 108*b* can have reagents for performing advanced staining protocols, such as immunohistochemistry protocols or in situ hybridization protocols. In some single-use embodiments, each stainer unit 108 can carry a sufficient amount of reagent to perform only a single protocol using fresh reagents to avoid producing excess reagent waste. The reagent reservoirs and waste containers can be permanently sealed to prevent reuse. The sealed containers can also facilitate disposal. In some multi-use embodiments, the reagent reservoirs can be refilled any number of times and the reagent chamber can be flushed and washed. The stainer units 108 can contain waste materials for convenient disposal. The waste materials can include waste reagents, wash solutions, or other fluids that can be collected in a removable waste container that can be discarded separately from other components of the stainer unit 108. This allows for separate handling of unused and used liquids.

The controller 130 can be used to select protocols and can receive information. The information can be inputted by the user using an input device 131, such as a keyboard, a touchscreen, or the like. In some embodiments, the staining instrument 110 includes one or more readers in communication with the controller 130. The readers can obtain information from machine readable labels, barcodes, or other types of labels applied to, for example, the microscope slides, stainer units, or reagent reservoirs. The controller 130 can command system components based, at least in part, on the obtained information, and can generally include, without limitation, one or more processors, computers, central processing units, microprocessors, digital signal processors (DSPs), application-specific integrated circuits (ASICs), readers, or the like. In some embodiments, the controller 130 can be programmed to receive information from microscope slides, process specimens based on the received information, and acquire one or more images of the processed specimens.

To store information, the controller 130 can include, without limitation, one or more storage elements, such as memory (e.g., volatile memory, non-volatile memory, read-only memory (ROM), random access memory (RAM)). For example, the memory can be non-transitory computer-readable memory that stores instructions that, when executed by a processor, cause the controller 130 to perform operations. The stored information can include, without limitation, reagent information, expiration information (e.g., expiration dates), stainer unit information, staining protocols, reagent recipes, heating programs, optimization programs, calibration programs, indexing programs, databases, imaging programs, and/or executable programs. The protocols can include reagent protocols (e.g., number and/or order of reagents applied), thermal protocols (e.g., heating/cooling routines), and other executable instructions for processing slides. The stored information can be used to determine, for example, protocols for processing the stainer unit based on information acquired from the stainer unit, inputted by an operator, or both, for example. In some embodiments, the instrument 110 can obtain information from the stainer unit and additional information from the microscope slide. The stainer unit information can indicate reagent volumes, staining protocol, or the like. The microscope slide information can include tissue information and staining to be performed. Based on that information, the controller 130 can determine an appropriate protocol for processing the tissue specimen based on the available resources, and if another stainer unit should be used, a notification can be provided to the user.

In operation, a user can manually load the stainer unit 108 with a specimen-bearing microscope slide. The user can visually confirm proper loading and can then feed the stainer unit 108 to the instrument 110. In other embodiments, the user separately loads microscopes slides and stainer units 108 into the staining instrument 110, which can robotically load the stainer units with the microscope slides. Closed reagent chambers of the stainer units 108 can prevent, limit, or minimize evaporative losses, stain degradation, cross-contamination between slides (typically experienced with dip and dunk systems), or other problems, thereby enabling control of reagent characteristics (e.g., concentrations, mixtures, etc.) to enhance the effectiveness of the reagents and resulting in desired staining characteristics.

The staining instrument 110 can controllably dispense fresh processing liquids onto the slides without splattering onto its mechanical or electrical components, as well as adjacent slides often present in conventional pipetting systems, and can controllably remove processing liquids from the slides via vacuum or liquid replacement or other suitable means. The controlled reagent dispensing/removal reduces volumes of liquid waste (e.g., waste reagents which have passed through the reaction chamber) by, for example, minimizing or otherwise limiting volumes of utilized reagents. In some embodiments, specimen processing may include contacting specimens with a series of liquids that include, for example, one or more deparaffinizing liquids, conditioning liquids, staining reagents, stain-differentiating reagents, stain-setting reagents, washing liquids, and/or coverslipping liquids.

The stainer units 108 can contain the reagents throughout processing such that the staining instrument 110 can process specimens without contacting the reagents. For example, the stainer units 108 can hold aliquots of reagent and can cause reagents to flow into a reaction chamber and into contact with a specimen. In some procedures, most of the reagent from multiple reservoirs is delivered to the flow cell to process the specimen. Most of the reagent, by volume, can be contained in the stainer units 108 is carried in a waste container upon completion of the specimen processing operations. For example, the waste container contains most of the reagent, by weight or volume, carried by the used stainer unit 108. In some procedures, the waste container contains at least 30%, 40%, 50%, 60%, 70%, 80%, 90%, and 95% of the total volume of reagent carried by the stainer unit. The used stainer unit 108, which still carries the unused reagents and waste reagent, can be removed from the instrument 110 for subsequent disposal.

The stainer units 108 can have integrated coverslips for viewing the specimen, thereby avoiding an additional coverslipping step. In some embodiments, the staining instrument 110 can perform a coverslipping operation. After coverslipping, the stainer unit 108, which carries the coverslipped slide, can be retrieved at the station 124. In other embodiments, the microscope slide can be coverslipped after removal from the instrument 110. Additional processing can be performed on the slide.

Figure 2:
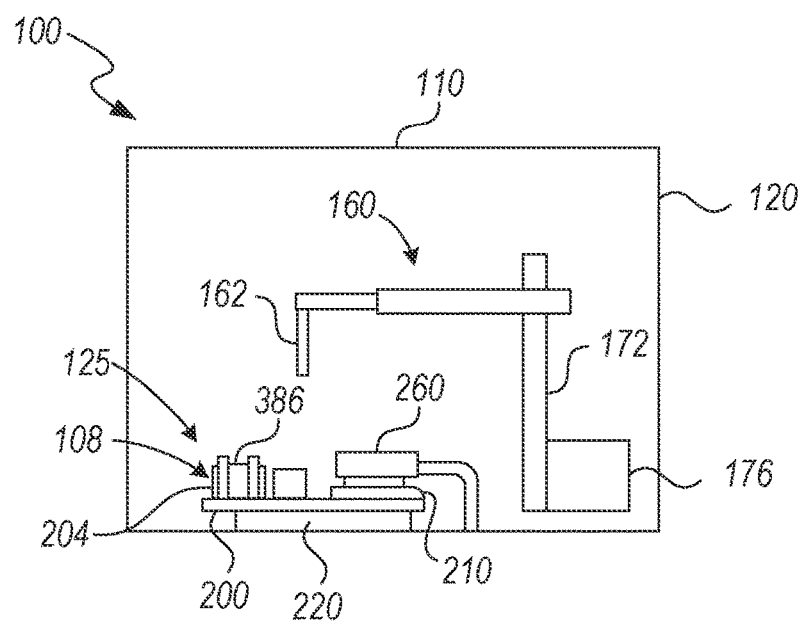
FIG. 2 is a front view of internal components of the specimen processing system of FIG. 1.

FIG. 2 is a front view of internal components of the instrument 110 in accordance with an embodiment of the disclosed technology. The instrument 110 can include a dispenser apparatus 160 configured to operate the stainer unit 108 in the form of a microfluidic slide processing cartridge, illustrated at a cartridge-receiving station 125. The stainer unit 108 can be include a base 200, a reagent unit 204, and a flow cell 210. The base 200 can include fluid components for delivering reagents to the flow cell 210. The instrument 110 can deliver, or cause to be delivered, reagents from reagent reservoirs of the reagent unit 204 to the flow cell 210.

The flow cell 210 can be a microfluidic cell capable of holding small volumes of liquid. This allows all or most of the reagents, by volume or weight, to be carried onboard the stainer unit 108. For example, microfluidic flow cells can hold less than, for example, about 25 µL, about 50 µL, about 100 µL, about 150 µL or about 200 µL. In some embodiments, the flow cell 210 can hold about 25 µL to about 100 µL, about 50 µL to about 120 µL, about 75 µL to about 120 µL, or other desired volumes. The specimen and reagent can be heated to a temperature equal to or higher than about 60° C., about 70° C., about 80° C., about 90° C., about 100° C., about 110° C., or about 120° C., or other desired temperatures. In some embodiments, the instrument 110 operates to apply heat to the specimen to provide a dwell temperature equal to or less than 60° C., about 70° C., about 80° C., about 90° C., about 100° C., about 110° C., or about 120° C. for a period of time. The period of time can be equal to or less than about 10 minutes, about 15 minutes, or about 20 minutes. The reagent unit 204 can be generally thermally isolated from the flow cell 210 to prevent or limit excessive heating of the standby reagents when the specimen is heated to high temperatures, for example, 120° C. In some embodiments, the flow cell 210 generates thermal energy to heat the specimen and/or reagents. For example, the flow cell 210 can include one or thermal elements (e.g., resistive heaters, Peltier devices, etc.) to generate the thermal energy.

The flow cell 210 can be used for deparaffinization, antigen/target retrieval, and staining using minimal volumes of fluid and can be configured for mixing (e.g., via agitation) or producing minimal diffusion layers to minimize or limit processing times. The flow cell 210 can contact the mounting surface of the slide to form a fluid-tight seal that is maintained throughout processing even when heat is applied to the specimen and the reagent, with a dwell at 100° C., 110° C., 120° C. for up to about 20 minutes. The liquid reagent, such as primarily water-based reagents, can be heated to temperatures higher than their normal boiling points to provide enhanced antigen/target retrieval. The flow cell area can be isolated by one or more seals (e.g., air-tight seals, fluid-tight seals, etc.) that can be maintained even when high pressures are experienced. This ensures that the reagents do not boil even at high altitude when the reagent is a temperature equal to or higher than 80° C., 90° C., 100° C., etc. The high-temperature processing enables enhanced staining in very short times. In some embodiments, the stainer units have pressurizable flow cells for high-temperature antigen/target retrieval. To raise the boiling point of the reagent, one or more valves can seal the reaction chamber by inhibiting or preventing the flow of fluid out of the reaction chamber, thereby raising a boiling point of the reagent. For example, the reaction chamber can be closed and pressurizable to raise the boiling point of the reagent (e.g., a reagent with a suitable antibody with associated marker) at least about 5%, 10%, 20%, or 30%.

The flow cell 210 can also remain sealed during processing to limit or prevent specimen loss, air bubble formation, or other problems, such as measurable evaporative losses. Thermal energy can be delivered uniformly or non-uniformly across the slide via conduction to produce a substantially uniform temperature profile along a specimen-bearing portion of the slide surface. In some embodiments, the substantially uniform temperature profile has a temperature variation equal to or less than a selected temperature variation across the specimen-bearing surface to achieve acceptable stain variation intensity. Non-uniform temperature profiles can also be produced along the slide or specimen if desired.

In some IHC protocols, multiple rinses at temperatures in a range between about 20° C. and about 70° C. can be applied. The rinses can include, without limitation, hydrophobic substances and organic solvents. Multiple dispense and removal steps can be performed. Each step can be performed at temperatures in a range of about 20° C. to about 70° C. and can utilize predetermined amounts of multiple reagents. The reagents can be combined prior to tissue contact. During a dwell period, the reagents within the flow cell can cover the entire specimen and, in some embodiments, can be agitated to achieve suitable staining performance. The sample can then be dehydrated and a coverslipping agent can be applied to the slide. A coverslip can be applied and the coverslipping agent can be heated to a suitable curing temperature (e.g., 70° C., 80° C., 90° C., or another suitable temperature). Alternatively, the flow cell can have an integrated coverslip. The stainer unit can allow visual access to both sides of the slides for automated imaging and visual inspection of the specimen.

The instrument 110 can perform one or more washing cycles to add and subsequently wash reagents from the flow cell 210. After incubation, reagent can be washed from the flow cell 210 to remove unreacted reagent that could affect a subsequent processing step. A washing cycle can include flushing the flow cell 210 with an excess of buffer or wash solution. The unreacted reagent can be diluted with the excess volume of the buffer or wash solution and driven out of the flow cell. In some embodiments, a washing cycle can include flushing the flow cell 210 with the wash solution. The wash solution could be miscible or immiscible with the prior reagent. In some embodiments, a washing cycle can include flushing the flow cell with a gas (e.g. air). In some protocols, a washing cycle can be performed for fluid exchange after each incubation.

Dispenser apparatus 160 can include a transporter apparatus 172 and an end effector 162. The transporter apparatus 172 can include, without limitation, one or more rail assemblies, robotic handlers, X-Y-Z transport systems, conveyors, drive elements 176 (e.g., actuators, drive motors, or the like), or other automated mechanisms or components. In some embodiments, the dispenser apparatus 160 can include a plurality of pumps, compressors, vacuum devices (e.g., blowers), and/or other devices capable of pressurizing fluids and/or providing a vacuum (including a partial vacuum). To perform multi-step protocols, the end effector 162 can sequentially deliver reagents from reagent reservoirs to a reaction chamber of the flow cell 210. The end effector 162 can include, without limitation, one or more orifices (e.g., jewel orifices), ports, nozzles, valves (e.g., one-way valves, check valves, pressure relief valves, etc.), sensors (e.g., pressure sensors, fluid detection sensors, etc.), grippers, pipette holders, pressurization devices (e.g., pumps), or other components for operating stainer units, controlling liquid delivery, or the like. The configuration and functionality of the end effector 162 can be selected based on the configuration of the stainer unit 108.

The stainer unit 108 can include a closure device 260 (e.g., a clamp) that applies pressure to the microscope slide, flow cell 210, etc. For example, the closure device 260 can apply sufficient pressure to a backside of a microscope slide to maintain a seal at the front side of a downwardly facing slide. By way of another example, the closure device 260 can apply pressure to a cover overlying the front side of an upwardly facing slide. The slide can be a generally rectangular piece of a transparent material having a front side or face for receiving the specimen. The slide can have a length of about 75 mm (3 inches), a width of about 25 mm (1 inch), and a thickness of about 1 mm (0.04 inch) and, in certain embodiments, may include a label and such a label can include characters and/or other machine-readable codes such as a barcode or an RFID tag. In other embodiments, information can be etched into the microscope slide or included within the microscope slide. Other dimensions are also possible. The microscope slide can be a standard microscope slide made of glass. The stainer unit 108 and/or slide can be held at a substantially horizontal orientation. The term "substantially horizontal" generally refers to an angle within about +/−2 degrees of horizontal. In some embodiments, the stainer unit 108 and/or slide are held at about +/−1 degree of horizontal or about +/−0.5 degree of horizontal. The slide can be held at other orientations and positions. The flow cell 210 can be configured to hold other types of substrates capable of carrying specimens in the form of cytological preparations, micro-arrays, tissue arrays, or the like.

The biological specimens disclosed herein can include one or more biological samples that can be a tissue sample or samples (e.g., any collection of cells) removed from a subject. The tissue sample can be a collection of interconnected cells that perform a similar function within an organism. A biological sample can also be any solid or fluid sample obtained from, excreted by, or secreted by any living organism, including, without limitation, single-celled organisms, such as bacteria, yeast, protozoans, and amebas, multicellular organisms (e.g., plants or animals, including samples from a healthy or apparently healthy human subject or a human patient affected by a condition or disease to be diagnosed or investigated, such as cancer). In some embodiments, a biological sample is mountable on a microscope slide and includes, without limitation, a section of tissue, an organ, a tumor section, a smear, a frozen section, a cytology prep, or cell lines. An incisional biopsy, a core biopsy, an excisional biopsy, a needle aspiration biopsy, a core needle biopsy, a stereotactic biopsy, an open biopsy, or a surgical biopsy can be used to obtain the sample.

With continued reference to FIG. 2, the dispenser apparatus 160 can be a robotic pipettor capable of retrieving, preparing, and/or dispensing liquids and can include, without limitation, one or more pipettor heads, aspiration tubes, valves, or other fluidic components. In some embodiments, the dispenser apparatus 160 has a single robotic pipettor configured to process one slide at a time. In other embodiments, the dispenser apparatus 160 can include a plurality of robotic pipettors for simultaneously processing multiple slides. The number, configurations, and functionality of the robotic pipettors can be selected based on the number of slides to be processed. A mixing station can be part of the stainer unit 108 or a part of the staining instrument 110 and can serve as a staging area that can significantly increase processing capacity or otherwise enhance processing. Reactive reagents, such as reagents that react immediately upon mixing, can be mixed immediately before dispensing to enhance stain consistency and quality. Because reagents can be staged before they are needed, slide processing capabilities can be increased.

The systems discussed herein can be configured to process non-pipetting stainer units. Such processing systems can include actuators, pushers, pressurizing devices, or other devices capable of operating components of the non-pipetting stainer units. In some embodiments, the end effector 162 can press down on blister elements to dispense reagents. In other embodiments, the end effector 162 can be in the form a pressurization nozzle configured to output pressurized fluid to cause liquids to flow from reagent reservoirs to the reaction chamber. Layouts and functionality of non-limiting exemplary processing systems are discussed in connection with FIGS. 3 and 4.

Figure 3:
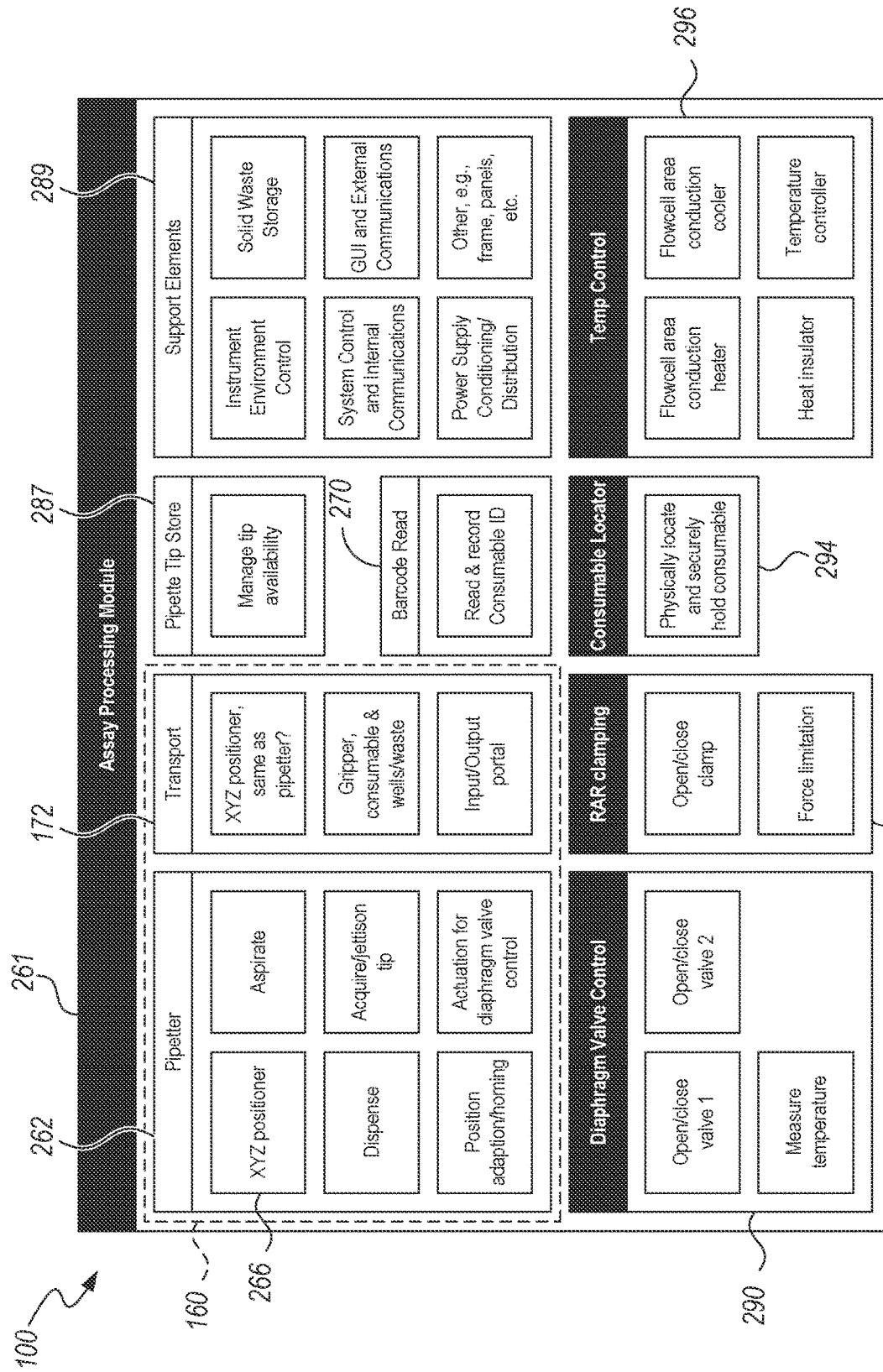
FIG. 3 is a block diagram of an automated specimen processing system with processing zones in accordance with an embodiment of the disclosed technology.

FIG. 3 is a block diagram of the system 100 in accordance with one embodiment of the disclosed technology. The system 100 can include an assay processing module 261 with a dispenser apparatus 160 that includes one or more pipettors 262 and the transporter apparatus 172. Each pipetter 262 can include one or more positioners 266 (e.g., XYZ positioners) for moving pipettes and fluid components (e.g., valves, fluid lines, etc.) for aspirating and dispensing. The pipetter 262 can acquire tips from a pipette tip storage unit 287 and jettison used tips at a waste area. The system 100 can include other dispenser apparatuses in addition to and/or in lieu of the pipettors 262.

A reader in the form of a barcode reader 270 can acquire information from stainer units, slides, containers or other items with labels or readable information. The information (e.g., consumable ID, tissue information, etc.) can be sent to a controller (e.g., controller 130 of FIG. 1). The controller can determine a processing protocol based on the received information. Multiple readers can be used to increase throughput. The number, positions, and configurations of the readers can be selected based on target throughput, reading capabilities, or other operating parameters.

The assay processing module 261 can include support elements 289. The support elements 289 can include one or more processors, sensors, controllers, waste containers, and housing components (e.g., frame, panels, etc.). Controllers can control processing environments, system components and/or communication and can include one or more displays for displaying GUIs or information, for example. Waste containers can store solid waste, such as used pipettor tips. The support elements 289 can include communication components (e.g., antennae, transmitters, ports, wireless modules, etc.), power supply conditioning/distribution components, or the like. The components and configuration of the support elements 289 can be selected based on, for example, whether the system 100 communicates with another system or network.

The assay processing module 261 can also include one or more control valve modules 290, clamping modules 292, consumable locator modules 294, and/or temperature control modules 296. The valve control modules 290 can include one or more sensors (e.g., pressure sensors, temperature sensors, etc.), valves (e.g., one-way valves, diaphragm or membrane valves, etc.), actuators (e.g., pushers for opening/closing diaphragm or membrane valves), and fluid lines, for example. The clamping module 292 can clamp onto the stainer unit. For example, the clamping module 292 can include a closure device (e.g., closure device 260 of FIG. 2) configured to apply pressure to a flow cell, slide, or the like. The consumable locator module 294 can physically locate and securely hold consumables. The temperature control module 296 can be part of a base (e.g., base 220 of FIG. 2) and can include one or more thermal elements, insulators, controllers, or the like. Thermal elements can be conduction heaters/coolers, resistive heaters, and/or Peltier devices and can be capable of localized heating/cooling at the flow cell area, so the flow cell and its contents can be heated/cooled without substantially affecting the temperature of the stored reagents.

Figure 4:
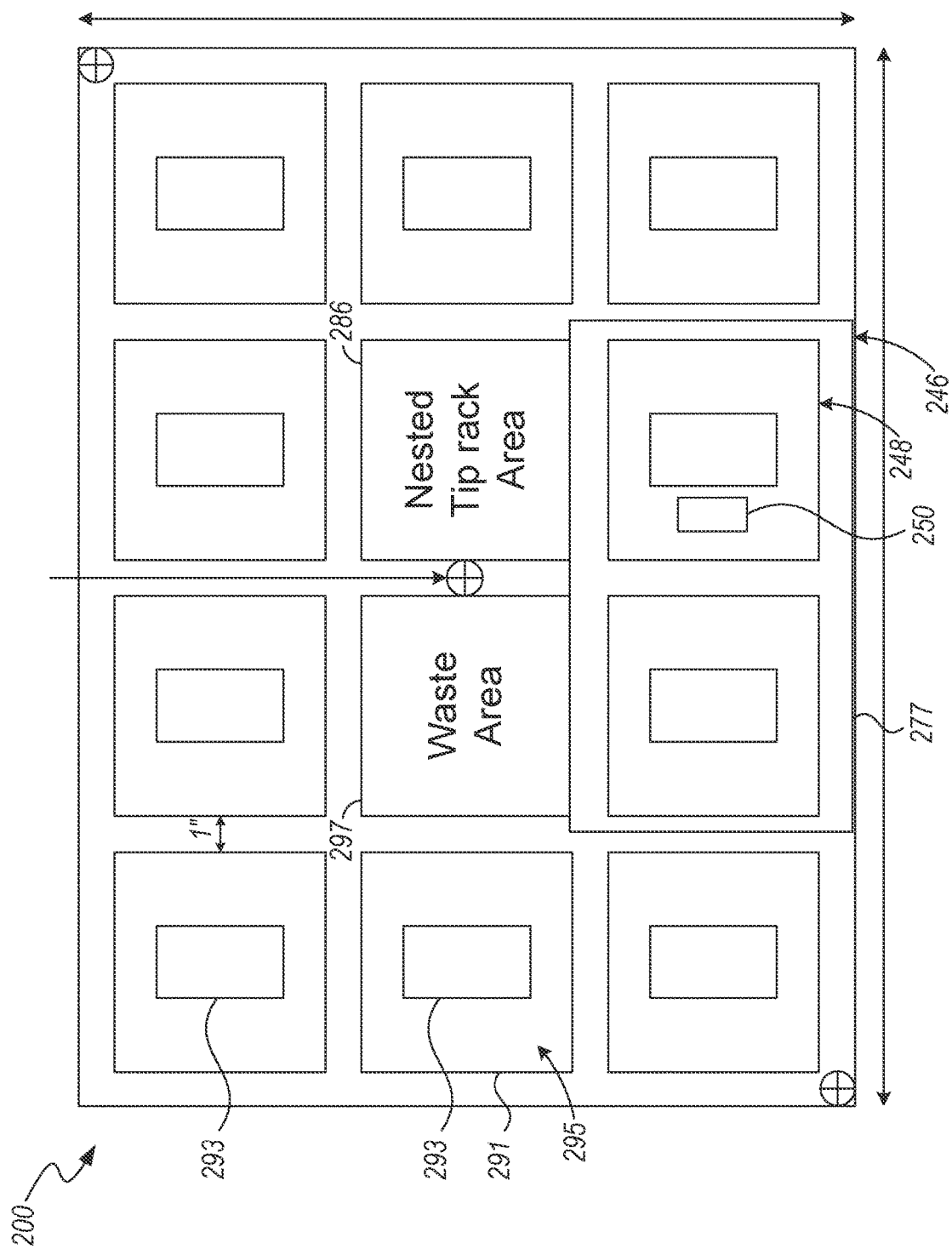
FIG. 4 is a plan view of an automated specimen processing system in accordance with an embodiment of the disclosed technology.

FIG. 4 is a top view of an automated slide processing system 200 configured for parallel processing of stainer units in accordance with an embodiment of the disclosed technology. The system 200 can include an array of processing zones or stations 291 (one identified), each capable of holding at least one stainer unit. Each processing station 291 can include a station 293 (two separate ones identified) configured to receive cartridges, stainer units, or the like. Although the illustrated embodiment has eight stations 291, system 200 can have any number of stations selected based on the desired processing throughout. Processing areas 295 surround respective stations 293. A waste reservoir or area 297 can include a container for collecting solid waste, liquid waste, or both. A supply station 286 can include a storage area (e.g., a nested tip rack area, a pipette tip storage area, etc.), coverslips, fluid containers, or the like.

In operation, stainer units can be manually or robotically loaded into the system 200 via a feed or input portal 246 ("input portal 246"). In some embodiments, an interrogation station 248 has a detector 250 positioned to analyze the slide, stainer units, or both. The detector 250 can include one or more readers, optical sensors, cameras, contact sensors, position sensors, or the like. A robotic transporter apparatus can retrieve stainer units from the station 248 and transport the retrieved stainer units to a desired zone or station. Each specimen-bearing slide can be processed based on one or more signals from the detector 250 according to, for example, one or more arbitrary user-defined sets of operations (e.g., a user-defined staining protocol), pre-defined sets of operations (e.g., preprogrammed protocol), or other processing instructions or routines. Processed stainer units can be parked at an output station 277 for removal.

Sensors can be located at various locations throughout processing systems, including on the transporter, within the processing zones, and incorporated into stainer units. In some embodiments, sensors (including, without limitation, strain gauges, accelerometers, contact sensors, optical sensors, or other sensing devices capable of sensing certain events) can be used to detect contact, collisions, impacts, or other events. The sensors can output one or more signals that are received by a controller, which can determine whether a given event requires user notification or other action. For example, if an unexpected position of a cover of a stainer unit is detected, the controller can alert a user to open an access door to visually inspect the stainer unit to determine, for example, whether the slide or cover is positioned properly.

The stainer units can include an integrated coverslip that covers the specimen to enable analysis without removing the slide from the stainer unit. In other embodiments, a slide can be removed from the stainer unit for manual or robotic coverslipping. In robotic coverslipping embodiments, a coverslipper can apply solvent to slides and can then place coverslips with pre-applied adhesive onto the slides. In one embodiment, the coverslipper is substantially as described in U.S. Patent Application Publication No. 2004/0092024A1 or U.S. Pat. No. 7,468,161, which are incorporated by reference herein in their entireties. The coverslippers described in U.S. Patent Application Publication No. 2004/0092024A1 or U.S. Pat. No. 7,468,161 and their operation can be implemented to enhance coverslip handling by, for example, detecting broken coverslips, facilitating single coverslip pickup, increasing coverslipper placement precision, and/or increasing system throughput. In some embodiments, the system 100 of FIGS. 1-3 can have a coverslipper. Additional modules can be added to the processing systems disclosed herein to provide any number of functionalities for processing of specimens with minimal or no human intervention during normal operation.

The number of processing zones or stations can be selected based on the desired processing throughout, and the components and functionality of each processing zone or station can be selected based on the processing protocols to be performed. The automated specimen processing system 100 or 200 can have any shape, and the processing zones be arranged in any manner. Each processing zone can be configured to hold any number of stainer units, for example, 1 stainer unit, 2 or more units, 3 or more slides, or 5 or more stainer units. For example, the processing zones or stations can be arranged in a linear arrangement, circular arrangement, or other suitable arrangement.

II. Stainer Units/Slide Processing Cartridges

Figure 5:
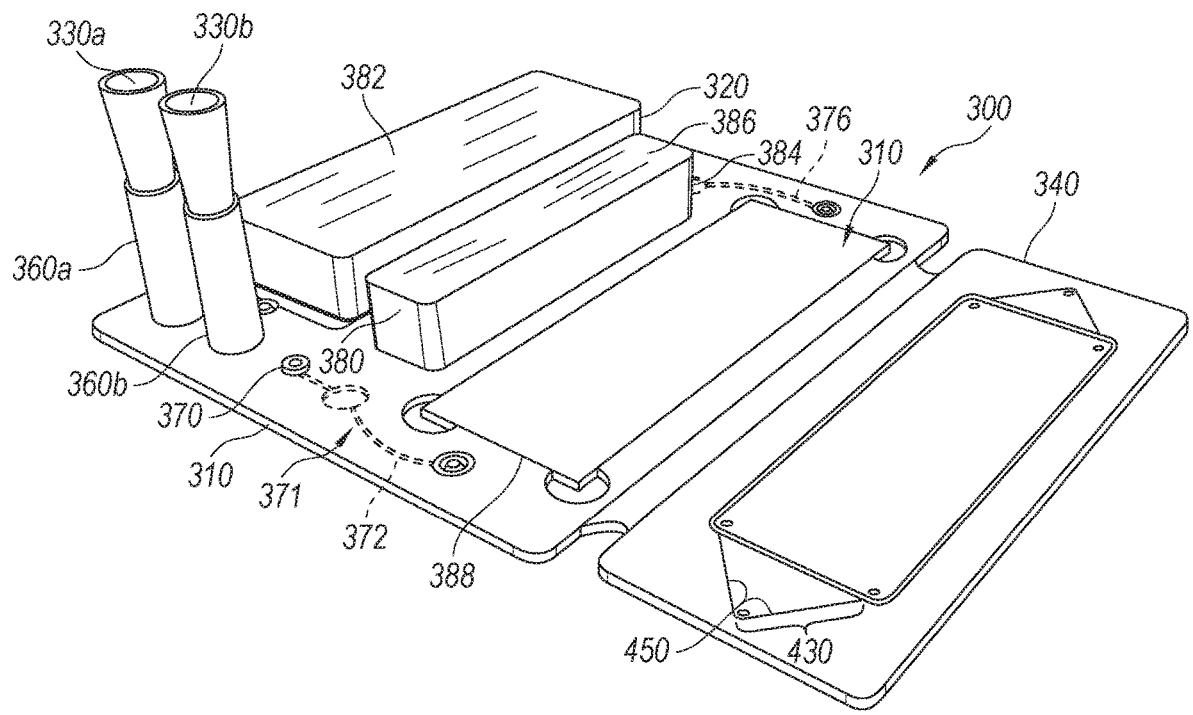
FIG. 5 is a perspective view of a stainer unit in accordance with an embodiment of the disclosed technology.
Figure 6:
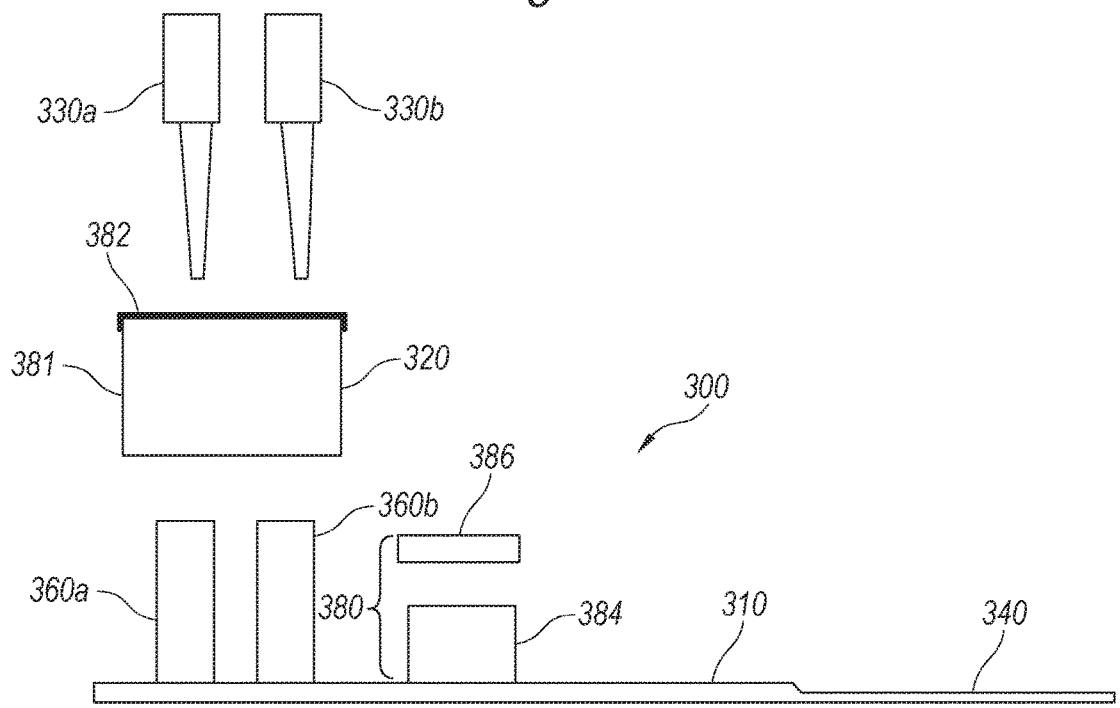
FIG. 6 is a front partially exploded view of the stainer unit of FIG. 5.

FIG. 5 is a perspective view of a stainer unit in the form of a consumable microfluidic slide processing cartridge 300 in accordance with an embodiment of the disclosed technology. FIG. 6 is a front partially exploded view of the slide processing cartridge 300. The slide processing cartridge 300 can include a base 310, a reagent unit 320 (shown spaced apart from the base 310 in FIG. 6), pipettes or pipette tips 330a, 330b (collectively "pipettes 330"), and a waste reservoir or collector 380. The reagent unit 320 can include a reagent container 381 and a removable cover 340. The pipettes 330a, 330b can be held in respective pipette receivers 360a, 360b of the base 310 and used for aspirating reagent. The waste reservoir 380 can include a container 384 and a removable or permanent cover 386.

Figure 7:
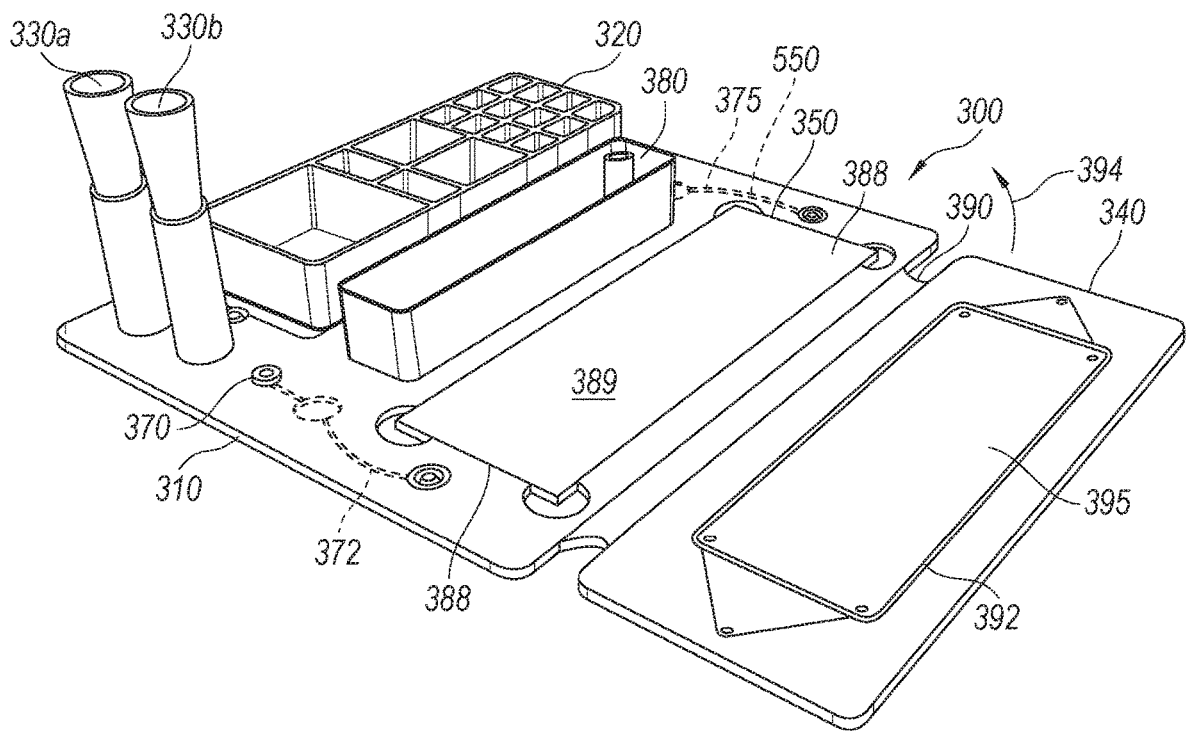
FIGS. 7 and 8 are perspective views of a stainer unit in different configurations in accordance with an embodiment of the disclosed technology.
Figure 8:
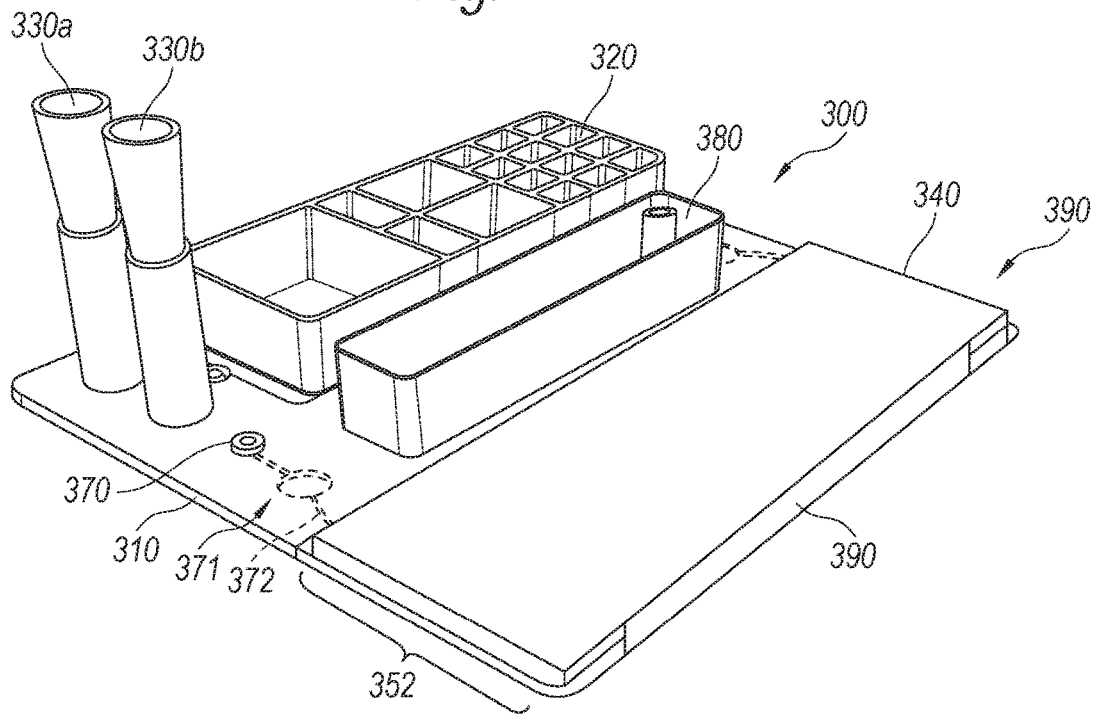

FIGS. 7 and 8 are isometric views of the slide processing cartridge 300 in different configurations. Referring now to FIG. 7, a specimen-bearing microscope slide 388 is located at a slide-receiving or set down region 350 ("slide-receiving region 350") in the base 310. A cover 340 can be moved (indicated by arrow 394) from an open position to a closed position (FIG. 8) to form a flow cell 352 (FIG. 8). The cover 340 can be hingedly coupled to the base 310 and can include a sealing ring 392 and a tissue-receiving area 395 surrounded by the sealing ring 392. The hinge 390 can be a living hinge, a movable joint, a flexible element, or another feature that allows movement of the cover 340, such that when the cover 340 is in the closed position, the sealing ring 392 can sealingly contact a specimen-bearing surface 389 (FIG. 7) of the microscope slide 388 to define a reaction chamber.

Referring now to FIG. 8, the pipettes 330a, 330b can be used to obtain reagents from the reagent unit 320 and can deliver the reagents to an input port 370 of the base 310. Any number of pipettes can be used. The base 310 can include a fluid circuit 371 with fluid passageway 372 and waste passageway 550 (FIG. 7) and can be connected to the flow cell 352. Fresh reagent can flow along the fluid passageway 372 and into the flow cell 352, and waste liquid (e.g., reacted reagents) can flow along the waste passageway 550 (FIG. 7) and into the waste reservoir 380. The slide processing cartridge 300 can prevent or limit air contact with the reagent to reduce the likelihood that degradation (e.g., oxidation) of the reagent will impair staining.

Figure 9:
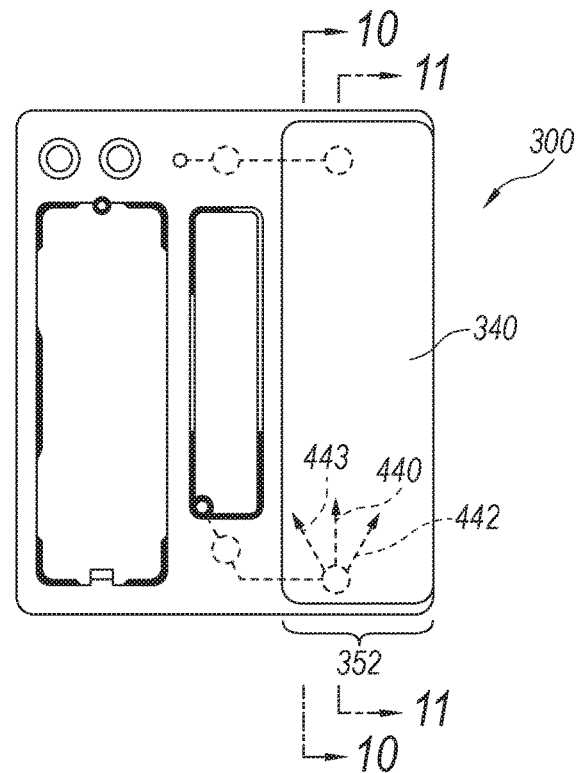
FIG. 9 is a top view of the stainer unit with a cover in a closed position.
Figure 10:
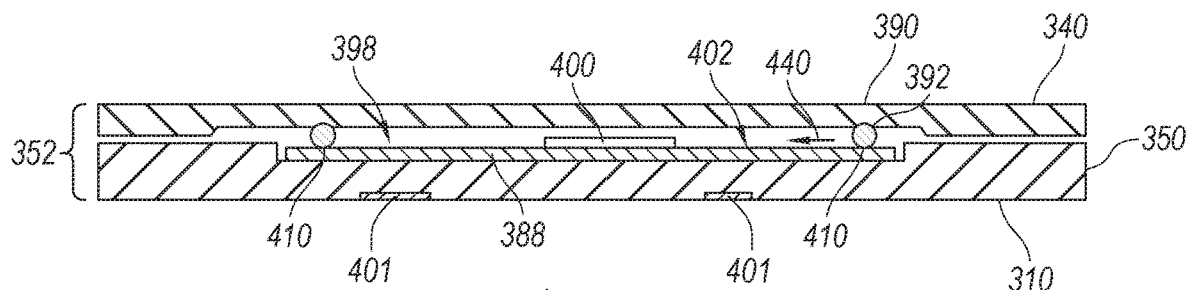
FIG. 10 is a cross-sectional view of the stainer unit taken along line 10-10 of FIG. 9.

FIG. 9 is a top view of the slide processing cartridge 300 with the cover 340 in the closed position. FIG. 10 is a cross-sectional view of the slide processing cartridge 300 taken along line 10-10 of FIG. 9. Referring to FIG. 10, the flow cell 352 defines a reaction chamber 398 that can contain small volumes of reagent that contact a specimen 400 located on an upper surface 402 of the slide 388. The reaction chamber 398 can have a holding capacity equal to or less than about 25 µL, 50 µL, 100 µL, or 200 µL. In some embodiments, the flow cell can hold about 25 µL to about 100 µL, about 50 µL to about 100 µL, or other desired volumes. The sealing ring 392 can sealingly contact the upper slide surface 402 to form a seal 410. In some embodiments, the slide-receiving region 350 can include one or more heating elements 401 for generating thermal energy that is delivered uniformly or non-uniformly across the slide 388 via conduction to produce a substantially uniform or varying temperature profile along the specimen-bearing surface 402. The heating elements 401 can provide active heating/cooling to set point temperature of about 20° C. to about 140° C. The base 310 can be made, in whole or in part, of one or more materials (e.g., plastic, metal, etc.) selected to provide the desired thermal conductivity for conductively heating the contents of the flow cell 352. The base 310 can rest on a temperature-controlled surface to transfer heat to and from the specimen and/or reagent.

In other embodiments, the base 310 can provide active heating/cooling to keep the specimen and/or reagent at a set point temperature in a specified range. For example, the heating elements 401 can heat substantially the entire mounting area of the slide to produce a substantially uniform temperature profile along the slide's width, length, or both. This ensures that any portion of a specimen contacting the mounting surface is maintained at a generally uniform temperature for consistent processing. In some embodiments, a substantially uniform temperature profile can be generated and may have less than selected temperature variation (e.g., a 0.5° C., 1° C., 2° C., 5° C., or 10° C. temperature variation) across the specimen-bearing portion of the specimen-bearing surface 402. Alternatively, the base 310 can generate non-uniform temperature profiles.

The sealing ring 392 can comprise one or more compressible materials (e.g., rubber, silicone, or the like) capable of forming the seal 410. The seal 410 can be a fluid-tight seal that prevents leaking of reagent and can be maintained when the pressure within the chamber 398 is at or above a pressure of about 1 bar, 1.5 bar, 2 bar, 2.5 bar, 3 bar, 3.5 bar, or 4 bar or other desired pressure suitable for pressurized staining. For example, a reagent within the chamber 398 can be at a pressure in a range of about 1 bar to about 4 bar, about 1.5 bar to about 3.5 bar, or the like. The pressurized reagent can be heated to temperatures higher than the normal boiling temperature of reagent (e.g., when the reagent is at atmospheric pressure) to provide enhanced antigen/target retrieval. The chamber 398 can kept at a high enough pressure to inhibit or prevent boiling of the reagent when the reagent (e.g., a reagent comprising primarily water) is at a temperature equal to or higher than about 80° C. (e.g., taking into account higher altitude conditions), 90° C., 100° C., or 105° C. The seal 410, as well as any other seals of the flow cell, can be selected to increase the boiling points of reagents or buffers at least about 5%, 10%, 15%, 20%, or 25%. Enhanced staining can be achieved in very short times with such an arrangement. A clamping device or a user's hand can press the cover 340 against the slide 388 with sufficient force to maintain the fluid-tight seal 410. In some embodiments, the seal 410 prevents surrounding air from entering the chamber 398 to limit or reduce degradation of the reagent. The configuration, mechanical properties (e.g., compressibility), and composition of the sealing ring 392 can be selected based on, for example, desired sealing capabilities, reaction chamber dimensions, or the like.

Figure 11:
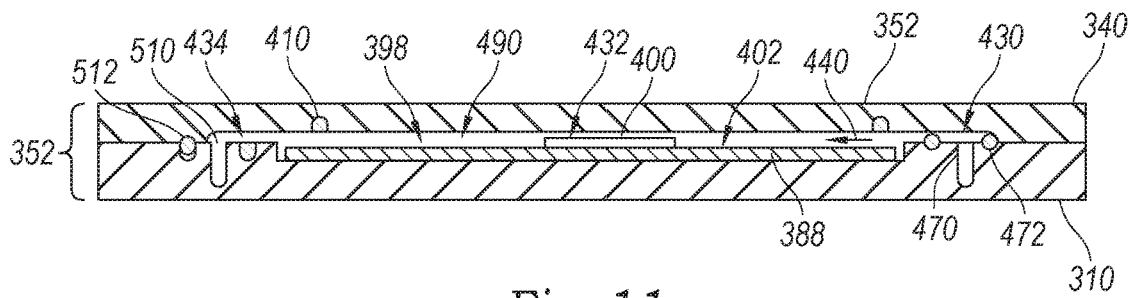
FIG. 11 is a cross-sectional view of the stainer unit taken along line 11-11 of FIG. 9.

FIG. 11 is a cross-sectional view of the slide processing cartridge 300 taken along line 11-11 of FIG. 9. The reaction chamber 398 has an inlet region 430, a specimen region 432, and an outlet region 434. The inlet region 430 widens laterally in a downstream direction (indicated by arrow 440) to allow reagent to spread outwardly toward the longitudinal sides of the slide 388 (indicated by arrows 442, 443 in FIG. 9). Referring now to FIGS. 5 and 11, the sidewalls 450, 450 (FIG. 5) in the cover 340 can define sides of the inlet region 430. The configuration of the inlet region 430 can be selected based on the desired flow into and through the chamber 398 (FIG. 11).

The flow cell 352 can include an inlet port 470 and an inlet sealing member 472. The inlet sealing member 472 can have a one-piece or multi-piece construction and can be a split ring, a gasket, or another sealing element configured to sealingly engage the cover 340. The sealing member 472 can include one or more openings, slits, thinned regions, or other features for directing fluid flow toward the reaction chamber 398. In other embodiments, the sealing member 472 can be eliminated by using, for example, male and female connectors. The fluid connections can be selected based on the desired sealing interfaces.

The cover 340 can have a lower surface 490 positioned to be spaced apart from the slide surface 402. The lower surface 490 can be generally parallel with the slide surface 402 to promote generally uniform laminar flow of reagent across the slide. In other embodiments, the reaction chamber 398 can be configured to promote turbulent flow. The configuration, dimensions, and features of the reaction chamber 398 can be selected based on desired flow rates, volume of reagent, and/or sealing capability.

The flow cell 352 can include an outlet port 510 at a downstream end of the reaction chamber 398. An outlet sealing member 512 can sealingly engage the cover 340 to inhibit or prevent reagent from escaping out of the flow cell 352 while waste reagent exits the reaction chamber 398. The sealing member 392 (FIG. 10) can include one or more openings, slits, narrowed or thinned regions, other features for allowing waste reagent or other fluids to flow through the outlet port 510.

The position and number of inlet and outlet ports can be selected based on the desired flow through the chamber 398. In some embodiments, a plurality of inlet ports 470 can be evenly or unevenly spaced along one side or end of the reaction chamber 398. Additionally or alternatively, a plurality of evenly or unevenly spaced outlet ports 510 can be positioned at an opposing side or end of the reaction chamber 398.

Figure 12:
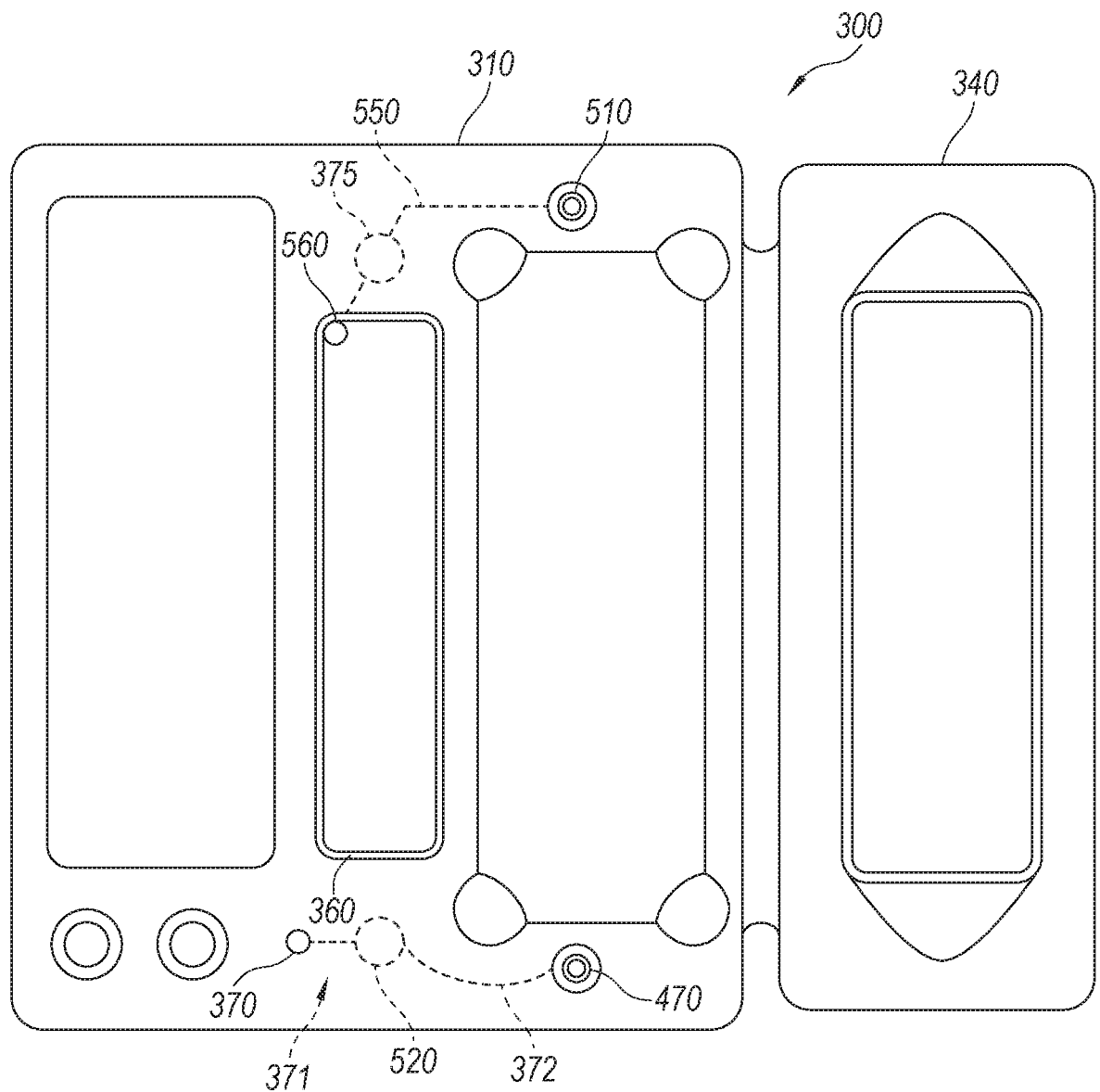
FIG. 12 is a top view of the stainer unit when the cover is in the open position.

FIG. 12 is a top plan view of the slide processing cartridge 300 when the cover 340 is in the open position. The fluid circuit 371 can provide fluid communication between the input port 370 and the inlet port 470 and can include one or more fluid elements 520 (e.g., valves, air-trap features, etc.) positioned along the fluid passageway 372. The fluid element 520 can include one or more entry valves (e.g., butterfly valves, ball valves, check valves, etc.) that can be opened and closed to seal the reaction chamber 398 (FIGS. 10 and 11) for high temperature processing, such as antigen retrieval, thereby inhibiting or preventing boiling of reagents. A waste or exit channel 550 provides fluid communication between the outlet port 510 and a waste entry port 560 associated with the waste container 380 and can include one or more fluidic elements 375, which can include one or more valves. The fluidic element 375 can be opened and closed to seal the reaction chamber 398 (FIGS. 10 and 11). The configuration and features of the fluid circuit 371 can be selected based on the characteristics of the reagents and target flow rates. Referring to FIG. 5, the waste container 380 can include a valve 561 that allows air to escape from the waste container 380 but not fluid.

Figure 13:
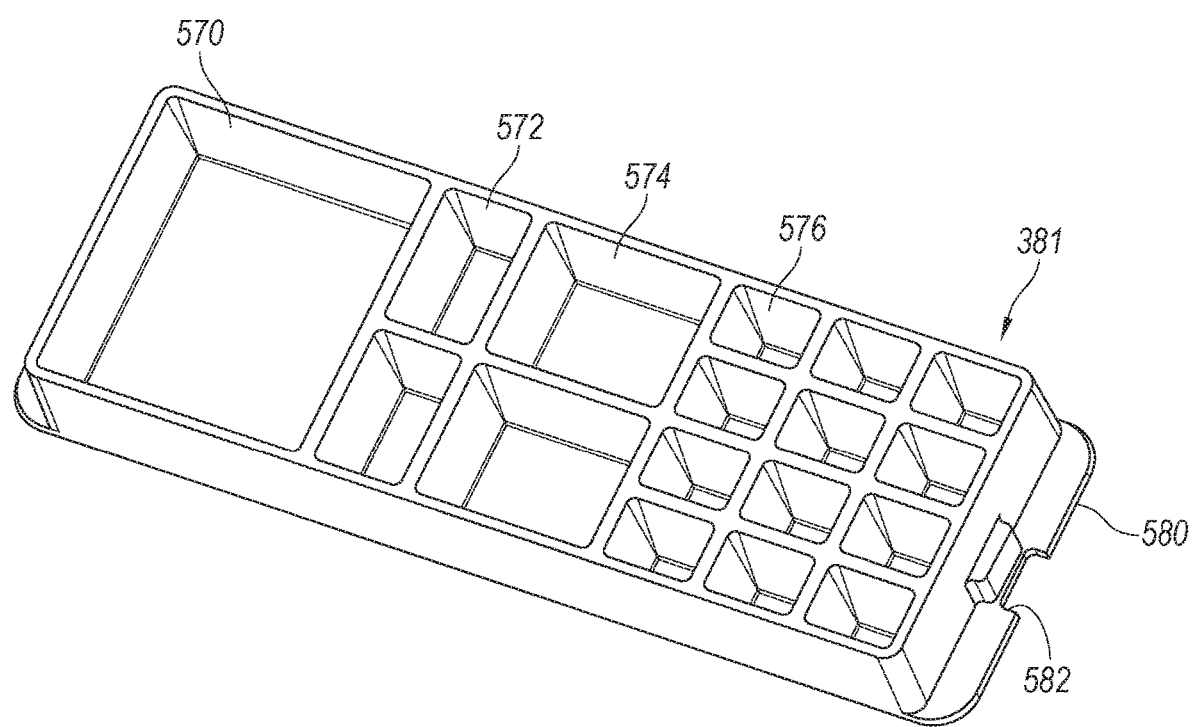
FIG. 13 is an isometric view of a reagent container in accordance with an embodiment of the disclosed technology.

FIG. 13 is an isometric view of a reagent container 381 in accordance with an embodiment of the disclosed technology. The reagent container 381 can be a tray having an array of reservoirs 570, 572, 574, and 576 (four identified). The large volume reservoir 570 can hold a rinse solution, whereas the smaller volume reservoirs 576 can hold reagents in smaller volumes. For example, the reservoir 570 can hold a volume of at least 2 mL, 3 mL, 4 mL, 5 mL, and each reservoir 576 can hold a volume less than about 3 mL (e.g., 0.5 mL, 1 mL, 2 mL, 3 mL, or 4 mL). The contents, holding capacity, and shape/configuration of the containers 381 can be selected based on the staining protocols to be performed. Table 1 below shows an example assay protocols and fluids, number of steps, volumes, and times (e.g., tissue exposure times). Other assay protocols can include different fluids, steps, volumes and times.

| Fluid | Number of Steps | Vol (mL) | Time (min) |
|---|---|---|---|
| CC2 | 1 | 0.3 | 44 |
| AOS | 5 | 1.3 | 2.3 |
| ATF | 2 | 0.6 | 0.5 |
| RB | 11 | 3.3 | 2.8 |
| Enzyme Digestion | 1 | 0.3 | 20 |
| SSC | 1 | 0.3 | 0.3 |
| Denaturation | 1 | 0.3 | 24 |
| Hybridization | 1 | 0.3 | 364 |
| Stringency Wash | 1 | 0.3 | 36 |
| Silver 2nd Ab | 1 | 0.3 | 24 |
| Silver 3rd Ab | 1 | 0.3 | 36 |
| Silver A | 1 | 0.1 | 20 |
| Silver B | 1 | 0.1 | 0 |
| Silver C | 1 | 0.1 | 0 |

-continued

| Fluid | Number of Steps | Vol (mL) | Time (min) |
|---|---|---|---|
| Red Linker | 1 | 0.3 | 24 |
| Red Multimer | 1 | 0.3 | 24 |
| pH enhancer | 1 | 0.1 | 16 |
| napthol | 1 | 0.1 | 0 |
| Fast Red | 1 | 0.2 | 0 |
| Hematoxylin | 1 | 0.3 | 1 |
| Bluing | 1 | 0.3 | 0.2 |

With continued reference to FIG. 13, the container 381 can include a base 580 with receiving features 582 that allow for convenient mounting to a base of the stainer unit. The receiving features 582 can be cutouts, notched regions, or other features for engaging a tang, a latch, or other features of the base 310. The container 381 can have a one-piece construction and can be made, in whole or in part, of plastic materials which are compatible with the assay reagents, such as polypropylene, polytetrafluoroethylene, or polyether ether ketone. Each reservoir can have an integrated cover, septum, or other features for minimizing, limiting, or substantially eliminating evaporative losses. The container 381 can also include, without limitation, one or more human readable labels, machine readable labels (e.g., a barcode), or other types of labels.

Figure 14:
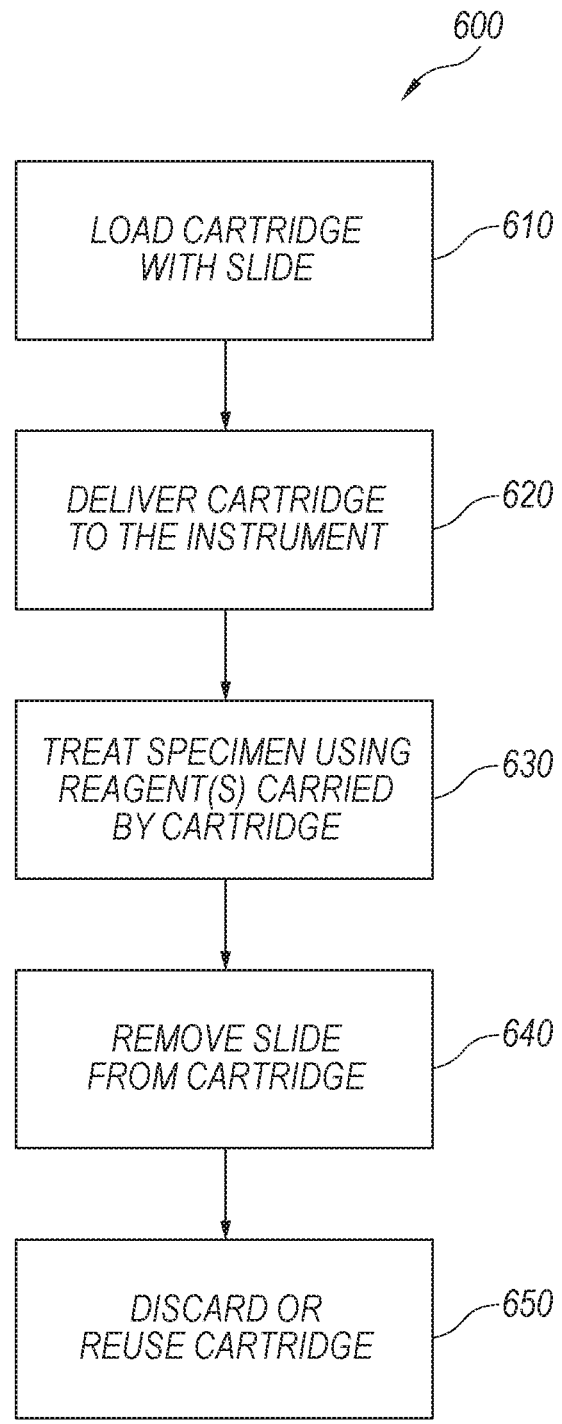
FIG. 14 is a flow chart illustrating a method for processing a specimen in accordance with an embodiment of the disclosed technology.

FIG. 14 is a flow chart illustrating a method 600 for processing a specimen in accordance with an embodiment of the present technology. In general, a stainer unit can be loaded with a specimen-bearing slide. The loaded stainer unit can be delivered to an automated instrument, and the specimen is processed using one or more reagents carried by the stainer unit. The stainer unit can contain the waste reagents. The processed specimen-bearing slide can be removed from the stainer unit for analysis. The method 600 can be performed using the stainer units and consumable cartridges as discussed in connection with FIGS. 1-13 and other stainer units discussed herein. Details of the method 600 are discussed in detail below.

Specimens can have the tissue fixated prior to placement in slide processing cartridges. A dryer can be used to remove water and can also help remove paraffin from paraffin-embedded specimens by melting and spreading the paraffin across the surfaces of the slides.

At block 610, the microscope slide 388 (FIG. 5) can be placed at the set down area 350 to load the slide processing cartridge 300. The cover 340 can be moved from the open position (FIG. 7) to a closed position (FIG. 8). FIG. 7 shows the reagent container 320 after removing of the cover 340.

At block 620, the loaded slide processing cartridge 300 can be delivered to the processing instrument. A user can input information into the instrument. A controller can determine a program for operating the components based, at least in part, on the inputted information. The inputted information can include, without limitation, one or more staining protocols, tissue sample information, processing times, imaging protocols, or the like. The user can also select a stored program to perform a desired protocol. If the stainer unit and/or slide include a label (e.g., RFID tags, transponders, or the like) that contains information that can be acquired by, e.g., readers, scanners, or other devices, and the acquired information can be sent to the controller, which in turn determine an appropriate program. The information can include expiration information (e.g., expiration dates). Different programs can be used to perform tissue conditioning, staining, antigen/target retrieval, IHC, ISH, etc. The programs can be calculated, determined, or selected based on information about the slide/specimen and/or the available reagents. For example, a program can be determined based on the available reagents carried by the slide processing cartridge, composition of the specimen, tissue, type, or the like. If the slide processing cartridge cannot be used to process the specimen, the processing instrument can notify a user that another slide processing cartridge should be used.

At block 630, the instrument can treat the specimen using reagents from the slide processing cartridge. The end effector 162 can use one of the pipettes 330a, 330b to perform a dispensing cycle that may include mixing reagents in a mixing well within the reagent container 320. The pipettes can be standard glass or plastic pipettes, such as disposable pipette tips used with hand-held, adjustable pipettors. The holding capacity of the pipettes can be in a range of about 20 µl to about 100 µl, about 100 µl to about 200 µl, about 1 microliters to about 5 microliters, 5 microliters to about 50 microliters, about 25 microliters to about 75 microliters, but more typically, the pipettes 330 will have a capacity in the equal to or less than about 25 µL, about 50 µL, about 100 µL, about 150 µL, or about 200 µL. In some embodiments, the pipettes 330 can hold about 25 µL to about 100 µL, about 50 µL to about 100 µL, about 75 µL to about 120 µL or other desired volumes.

In some embodiments, the end effector 162 can couple to an upper end of the pipette 330a (FIG. 5) and can carry the pipette to the reagent container 320. The apparatus 160 (FIG. 2) can aspirate reagents out of reservoirs and can carry the loaded pipette 330a to the input port 370 (FIG. 7). The apparatus 160 can create positive pressure that causes the reagent to flow from the pipette 330a into the input port 370 and through the fluid circuit 371. The reagent can flow into the flow cell and to fill the reaction chamber 398 (FIG. 9). The closed flow cell 352 can prevent evaporative losses to avoid using excessive amounts of reagent. The reagent can be replenished with fresh reagent any number of times to achieve desired staining. For example, the controller 130 can instruct the dispenser apparatus 160 to provide supplemental reagent at a desired rate (e.g., a fixed rate or a variable rate) based on the degradation or oxidation rates of the liquid.

In some protocols, a series of liquids can include, for example, a deparaffinizing liquid, a conditioning liquid, a staining reagent, a stain-differentiating reagent, a stain-setting reagent, a counterstaining reagent, a washing liquid, and a coverslipping liquid. During deparaffinizing, a paraffin composition in which the specimen is embedded can be at least partially removed to prepare the specimen for further processing. The system 200 of FIG. 4 can process slides in parallel. In at least some cases, deparaffinizing includes iterations (e.g., 4, 5, 6, 7, 8, or another suitable number of iterations) of dispensing a deparaffinizing liquid onto slides respectively carrying the specimens, allowing the dispensed deparaffinizing liquid to remain in contact with a paraffin composition in which the specimens are embedded for a suitable period of time so as to solubilize a portion of the paraffin composition, and then removing the dispensed deparaffinizing liquid along with a solubilized portion of the paraffin composition.

After deparaffinizing and conditioning, staining, antigen/target retrieval, IHC, ISH, or other processes can be performed on the conditioned specimen. Optional washing can include iterations (e.g., 2, 3, or another suitable number of iterations) of dispensing a washing liquid onto a slide, allowing the dispensed washing liquid to remain in contact with the specimen for a suitable period of time so as to wholly or incrementally wash the specimens (e.g., while the washing liquid is in the form of a puddle having a shape maintained at least partially by surface tension), and then removing the dispensed washing liquid. The washing liquid can flush out the deparaffinizing and solutions. The time during which the dispensed washing liquid is in contact with the specimen can be, for example, a time within a range from 5 seconds to 45 seconds, from 20 seconds to 1 minute, or the like. When used in temperature-controlled flow cells configured in accordance with at least some embodiments of the present technology, incubation temperatures can be used alone or in conjunction with incubation time to control processing.

The specimen can be dehydrated and a coverslip can be applied. Coverslipping liquids can be applied directly to the microscope slide after opening the cover. A coverslipping liquid selected or formulated in accordance with a particular embodiment of the present technology includes about 100% d-limonene with a suitable preservative, such as 500 parts per million butylated hydroxytoluene. After applying the coverslipping liquid, the system or user can then apply coverslips. For example, an automated coverslipper can apply solvent to the slides and can place coverslips with pre-applied adhesive onto the slides.

At block 640 of FIG. 14, the slide processing cartridges can be removed from the instrument and opened to remove the processed slide. The specimen can be microscopically analyzed. The waste materials (e.g., reacted reagent) can be contained in a waste container of the cartridge throughout slide removal and disposal.

At block 650, the cartridge itself or its disposable components can be discarded. As used herein, the term "disposable" when applied to a system or component (or combination of components), such as a stainer unit or sample element, is a broad term and means, without limitation, that the component in question is used a finite number of times and then discarded. Some disposable components are used only once and then discarded. Other disposable components are used more than once and then discarded. For example, a disposable waste container can be used to collect waste generated by a single assay and is then discarded whereas a base of a cartridge can be used multiple times. In some embodiments, a frangible or clip connection block 582 of FIG. 13 between a disposable waste container and a base can be broken to remove the waste container. This operation can be performed by the end effector 162 of FIG. 2 or as a block 650 operation by the user.

Although various operations are presented in a sequence(s), it should be understood that the various operations discussed in connection with method 600 may be performed in orders other than those that are illustrated, or may be performed concurrently. Examples of such alternate orderings includes interrupted, reordered, supplemental, simultaneous, reverse, or other variant orderings, unless context dictates otherwise. For example, the specimens can be pretreated, either manually or robotically, with conditioners at block 630 prior to delivery to the instrument at block 620. The method 600 can be performed with the stainer units of FIGS. 15-28, and the description of the stainer units discussed in connection with FIGS. 1-14 applies equally to the stainer units of FIGS. 15-28. In some embodiments, the flow cell can be opened to access the slide for coverslipping. In one embodiment, an automated coverslipper as substantially as described in U.S. Patent Application Publication No. 2004/0092024A1 or U.S. Pat. No. 7,468,161, which are incorporated by reference herein in their entireties, can be integrated the systems disclosed herein. After opening a cover, the automated coverslipper can apply the coverslip to the uncovered slide. The coverslippers described in U.S.

Patent Application Publication No. 2004/0092024A1 or U.S. Pat. No. 7,468,161 and their operation can be implemented to enhance coverslip handling by, for example, detecting broken coverslips, facilitating single coverslip pickup, increasing coverslipper placement precision, and/or increasing system throughput.

Figure 15:
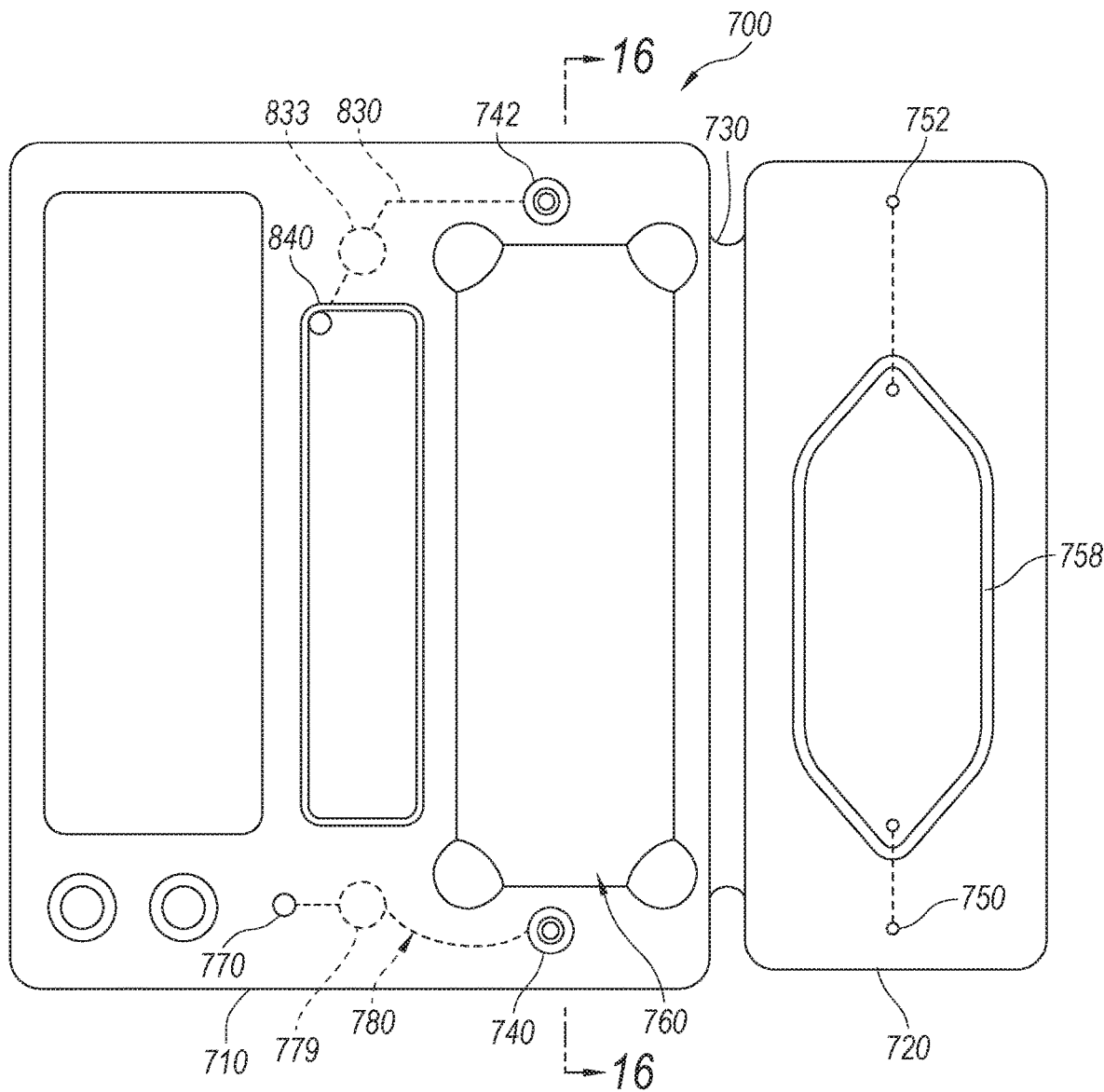
FIG. 15 is a top plan view of a stainer unit in accordance with another embodiment of the technology.

FIG. 15 is a top plan view of a stainer unit in the form of a microfluidic microscope slide processing cartridge 700 ("processing cartridge 700") in accordance with another embodiment of the technology. In general, the processing cartridge 700 can define a fluid circuit 780 with continuous flow path between an input port 770 and the waste reservoir or container 840. Fluid can be delivered into a reaction chamber via a cover 720 while maintaining a seal between the cover 720 and the microscope slide at a set down area 760. The microscope slide can be set down face up with a specimen on an upwardly facing mounting surface for convenient slide mounting. The cover 720 is configured to provide fluid communication with a reaction chamber while a sealing member 758 maintains a fluid-tight seal with the microscope slide. This enables fluid at a wide range of pressures, including relatively high pressures, to be delivered into the reaction chamber. A hinge 730 rotatably couples the cover 720 to the base 710. The base 710 can include ports 740, 742 that are configured to mate with ports 750, 752, respectively, of the cover 720 when the cover 720 is moved to a closed position.

Figure 16:
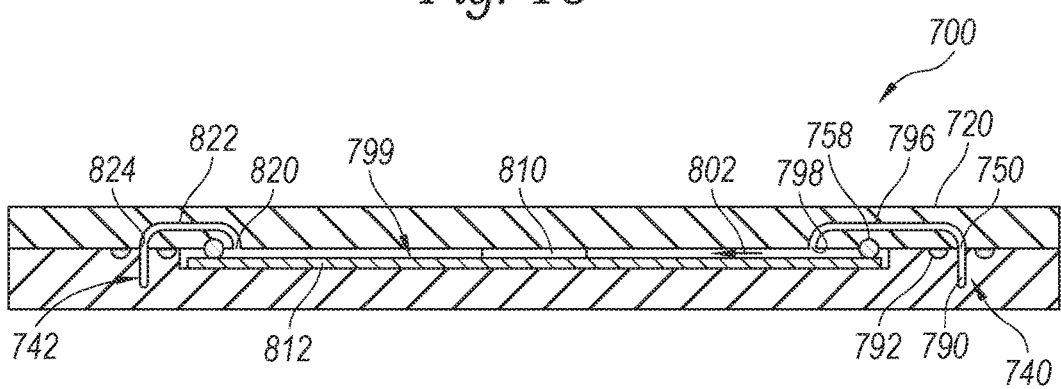
FIG. 16 is a cross-sectional view of the stainer unit taken along line 16-16 of FIG. 15 when a cover is at a closed position.

FIG. 16 is a cross-sectional view of the cartridge 700 taken along line 16-16 of FIG. 15 when the cover 720 is in a closed position. Fluid delivered into the base input port 770 (FIG. 15) can flow along a flow passageway of a fluid circuit 780 (FIG. 15) to the port 740. A valve 779 can be positioned along the flow passageway and can be moved from an open configuration to a closed configuration. Referring to FIG. 16, the port 740 can include an outlet 790 and sealing member 792 for sealingly engaging the cover 720. A fluid can flow out of the outlet 790 and into the cover port 750 of the cover 720. The fluid can continue to flow along a cover passageway 796 and can flow through a reaction chamber inlet 798. The fluid can flow along the reaction chamber 799, as indicated by arrow 802, to contact a specimen 810. The reacted reagent can exit the chamber 799 by flowing through a reaction chamber outlet 820. The waste reagent can flow along a fluid passageway 822 and can exit the cover 720 via a waste port 824. The liquid waste proceeds through the port 742, along a waste passageway 830 (FIG. 15) and ultimately to a waste reservoir or collector 840. An exit valve 833 can be positioned along the passageway 830 and can be moved from an open configuration to a closed configuration. Both valves 779, 833 can be closed to seal the reaction chamber for pressurized/high-temperature processing steps. In this manner, the cover 720 provides fluid communication with the reaction chamber 799 while maintaining a seal with a slide 812 (FIG. 16), even throughout specimen processing.

Figure 17:
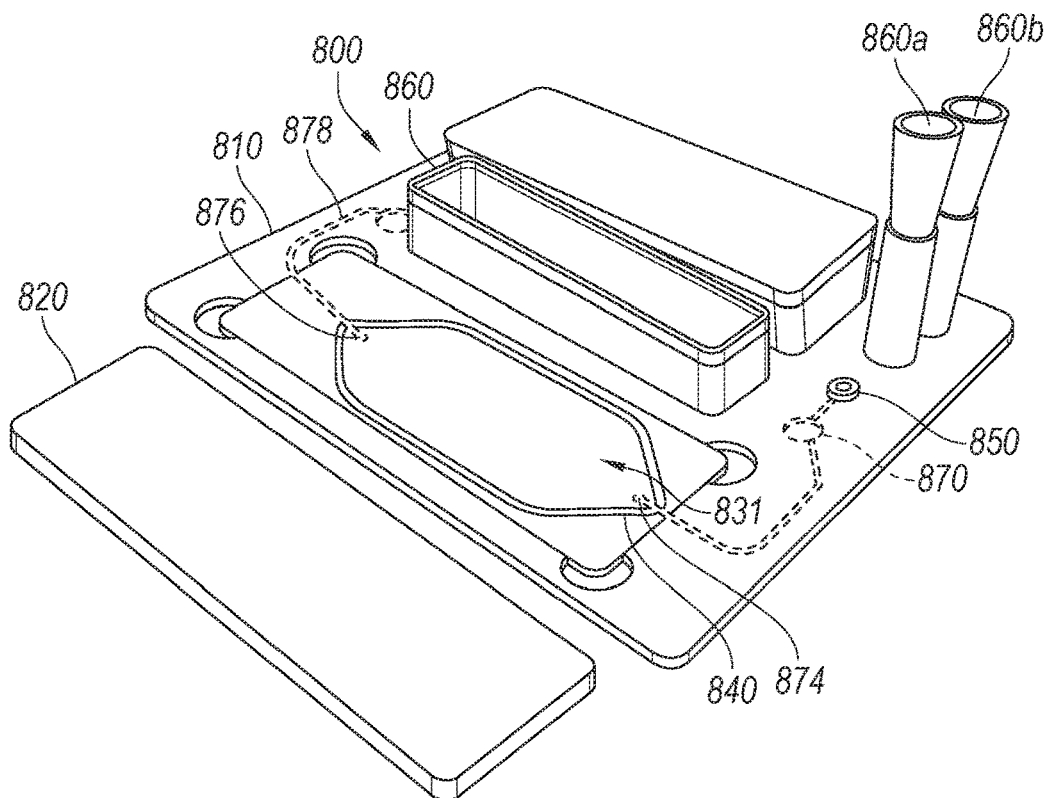
FIG. 17 is a perspective view of a stainer unit in accordance with another embodiment of the technology.

FIG. 17 is a perspective view of a stainer unit in the form of a slide processing cartridge 800 that includes a base 810. A microscope slide can be mounted face down to position a specimen at a specimen-receiving region 831 surrounded by a sealing member 840 of the base 810. The base 810 has an input port 850 for receiving reagent from pipettes 860a, 860b. When a microscope slide is placed face down at the region 831, the sealing member 840 sealingly contacts the specimen-bearing surface of the microscope slide. Reagent can flow through the input 850 and along a delivery passageway 870. The fluid passes through a reaction chamber inlet 874 and fills the reaction chamber. The reagent exits the reaction chamber via a reaction chamber outlet 876, flows along an outlet passageway 878, and ultimately enters a waste reservoir or collector 860.

Figure 18:
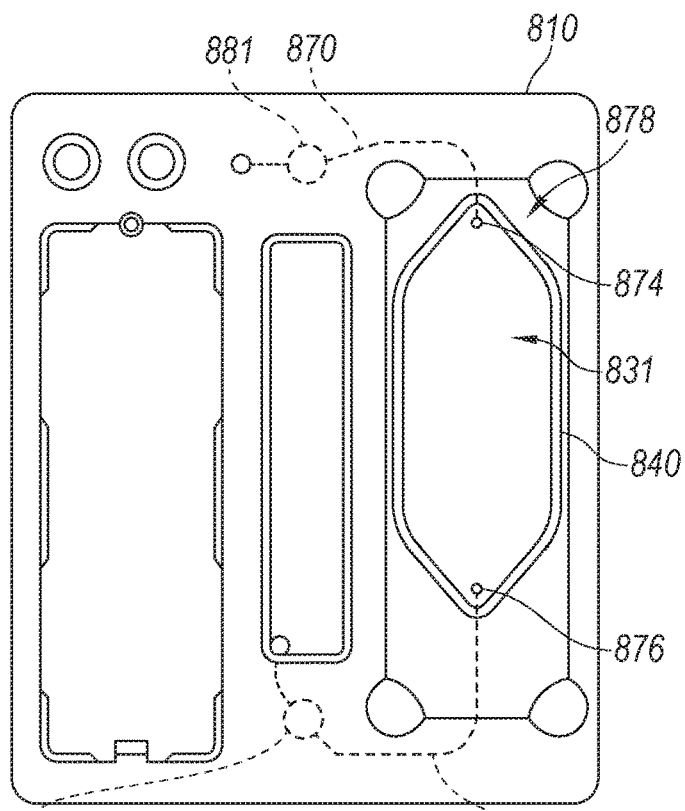
FIG. 18 is a top plan view of the stainer unit of FIG. 17.

FIG. 18 is a top view of the base 810 in accordance with an embodiment of the disclosed technology. The sealing member 840 can be a continuous member that surrounds the specimen-receiving region 831, illustrated as a substantially hexagonal-shaped region, of a generally rectangular slide-receiving region 878. The inlet 874 and outlet 876 are positioned at opposing ends of the specimen-receiving region 831, but the inlet 874 and outlet 876 can be positioned at other locations. An entry valve 881 positioned along the delivery passageway 870 and an exit valve 889 positioned along an outlet or waste passageway 878 can be closed to seal the reaction chamber.

Figure 19:
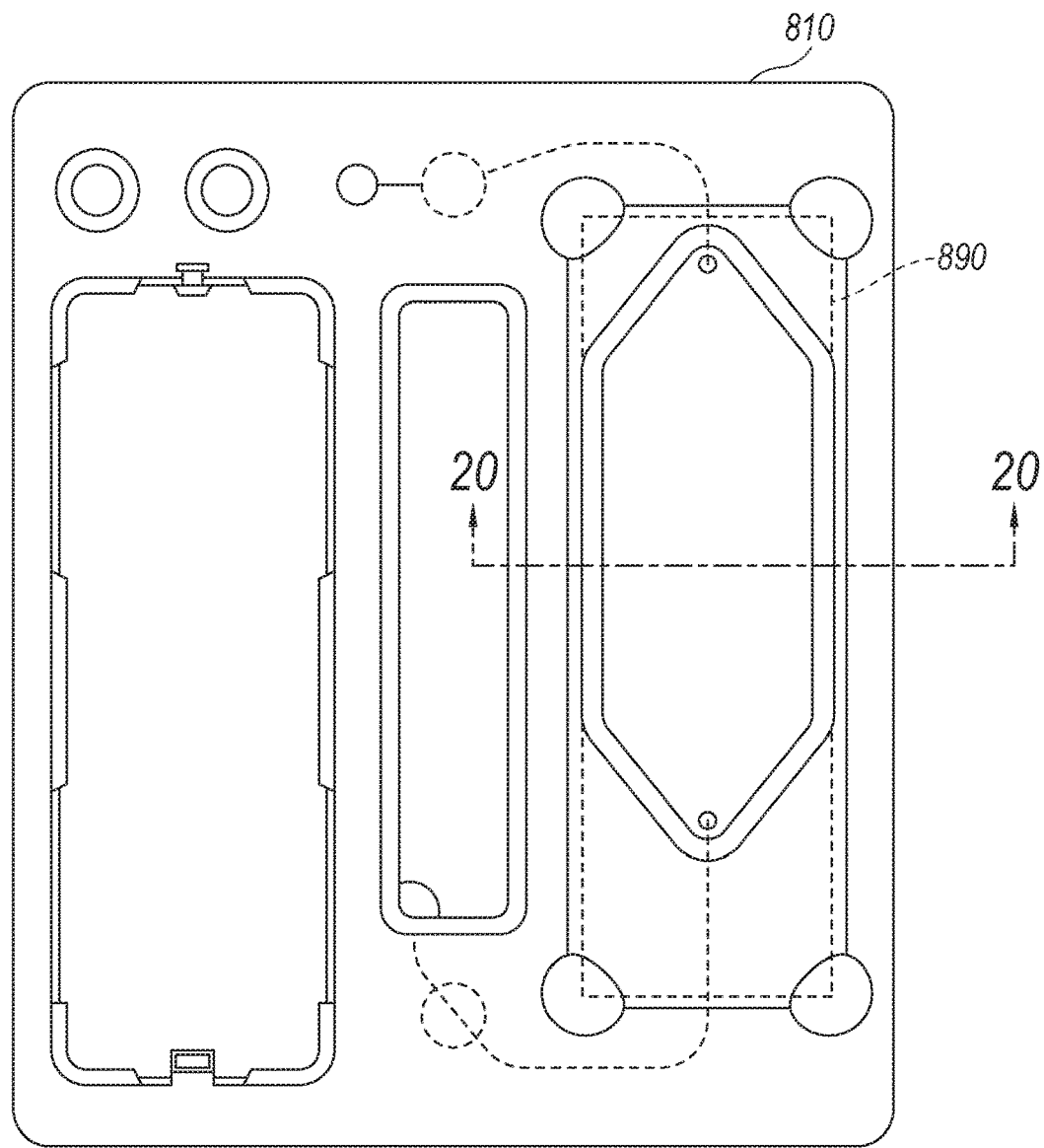
FIG. 19 is a top plan view of the stainer unit of FIG. 17 holding microscope slide.
Figure 20:
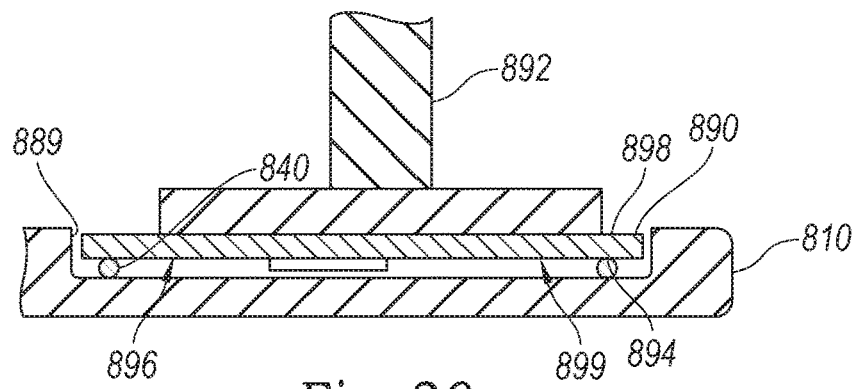
FIG. 20 is a cross-sectional view of the stainer unit taken along line 20-20 of FIG. 19 when a cover holder presses down on a cover.

FIG. 19 is a top plan view of the base 810 carrying a microscope slide 890 (illustrated in dashed line). FIG. 17 is a cross-sectional view taken along line 20-20 of FIG. 19 when a cover holder 892 is pressing down on the microscope slide 890. A sufficient amount of pressure can be applied such that the sealing member 840 sealingly engages a mounting surface 899 of the slide 890. The cover holder 892 can press downwardly on the back side 898 of the microscope slide 890 to maintain a fluid-tight seal 894 to provide a pressurizable reaction chamber 896. The sealing member 840 can be coupled to, embedded in, or otherwise fixedly coupled to the recessed region 889 of the base 810.

Figure 21:
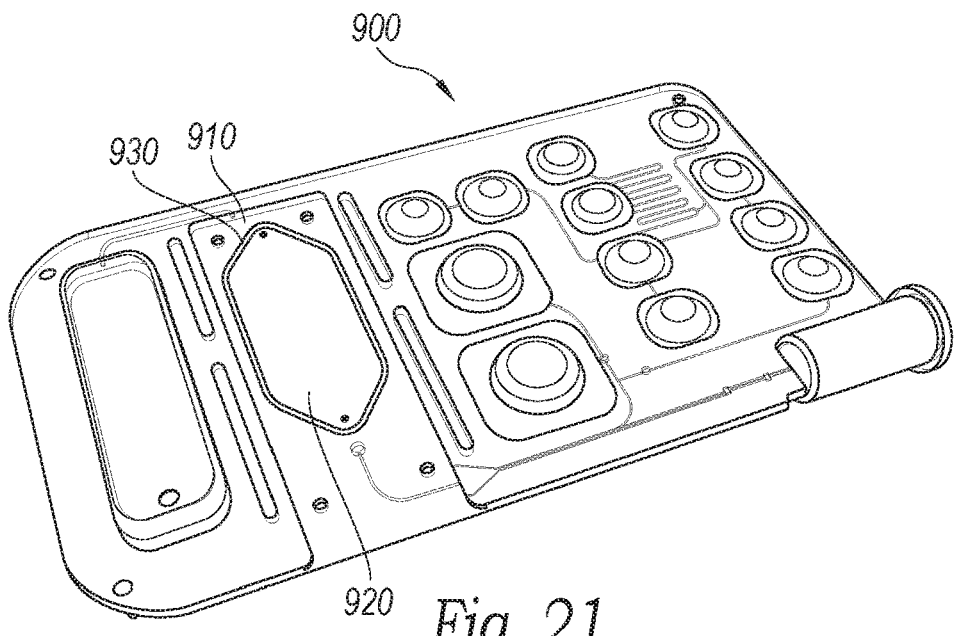
FIG. 21 is a perspective view of a stainer unit in accordance with another embodiment of the technology.

FIG. 21 is a perspective view of a stainer unit in accordance with another embodiment of the technology. A slide processing cartridge 900 can include a flow cell 910 having a slide-receiving region 920 and a sealing member 930. The slide-receiving region 920 is configured to receive a microscope slide such that the sealing ring 930 sealingly contacts the specimen-bearing surface of the microscope slide to define a reaction chamber. The cartridge 900 can include dispensers each associated with a reagent reservoir.

Figure 22:
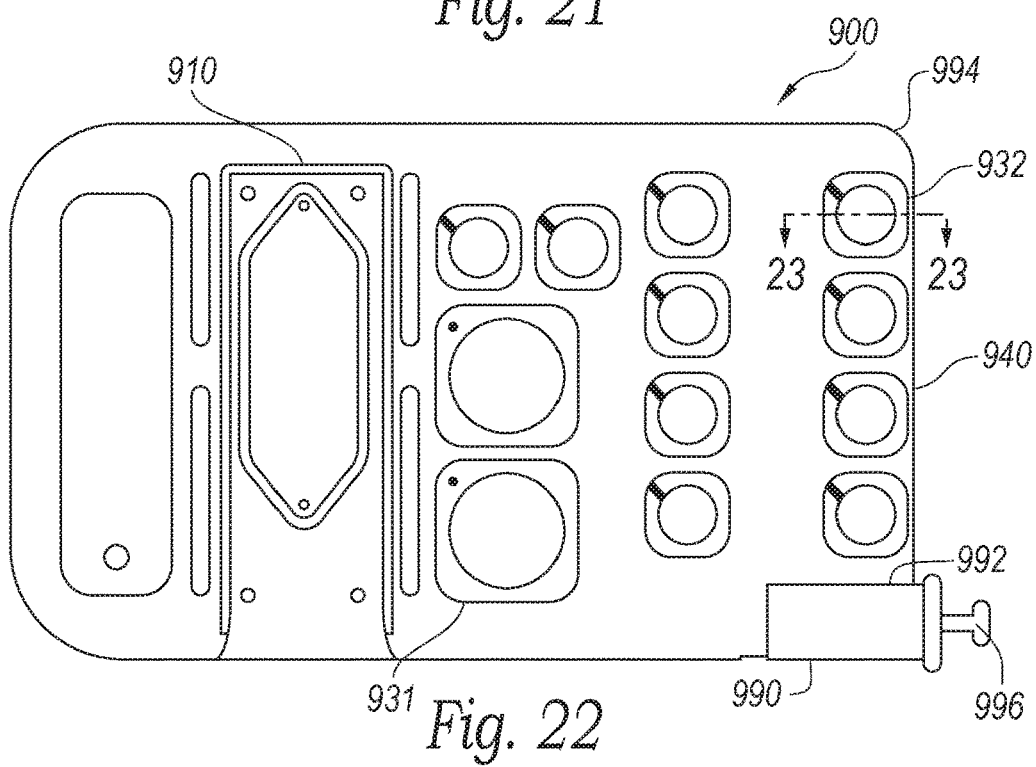
FIG. 22 is a top plan view of the stainer unit of FIG. 21.

FIG. 22 is a top plan view of the cartridge 900 that can include bulk volume dispensers 931 (one identified) and small volume dispensers 932 (one identified). The bulk volume dispensers 931 can contain wash solutions, rinse solutions, or other bulk liquids whereas the dispensers 932 can carry stains or other fluids that will be dispensed in relatively small volumes. The cartridge 900 can also include a base 994 with a fluid circuit that fluidly couples each dispenser to the flow cell 910.

The cartridge 900 can have a syringe 990 for carrying and delivering bulk fluid to the flow cell 910. The syringe 990 can include a main body or cylinder 992, which is integrated with or coupled to the base 994, and can have a plunger 996. The plunger 996 can be depressed to pressurize fluid that is delivered to the flow chamber or other locations. The syringe 990 can be used to refill a dispenser with a volume of fluid.

Figure 23:
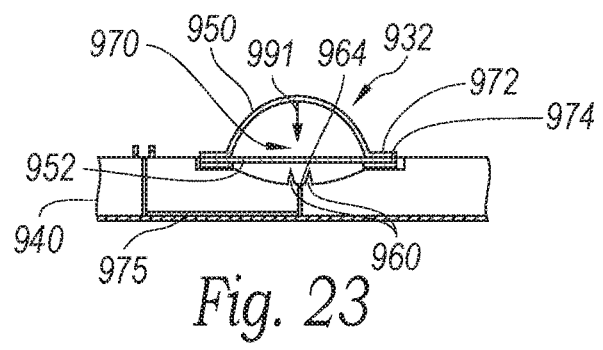
FIG. 23 is a cross-sectional view of an actuator taken along line 23-23 of FIG. 22.

FIG. 23 is a cross-sectional view of the actuator 932 taken along line 23-23 of FIG. 22. The actuator 932 can be a blister element capable of being depressed to release and push a fluid through fluid passageways in the base 940. The blister element 932 can include a blister 950, a pierceable or frangible element 952, and one or more piercing members 960. The blister 950 can be made, in whole or in part, of metal, plastic, other suitable material for defining a fluid reservoir 970. The frangible or pierceable element 952 can be a foil or septum extending across the opening defined by the blister 950. One or more adhesives can couple together a periphery 972 of the blister 950 and a periphery 974 of the element 952. The element 952 can be coupled to the base 940 by one or more adhesives. When the blister 950 is moved downwardly, as indicated by arrow 991, the element 952 can brought into contact with the piercing members 960. In some embodiments, the piercing members 960 can be positioned on opposite sides of an inlet 964 of a fluid passageway 975 in communication with the flow chamber.

Figure 24:
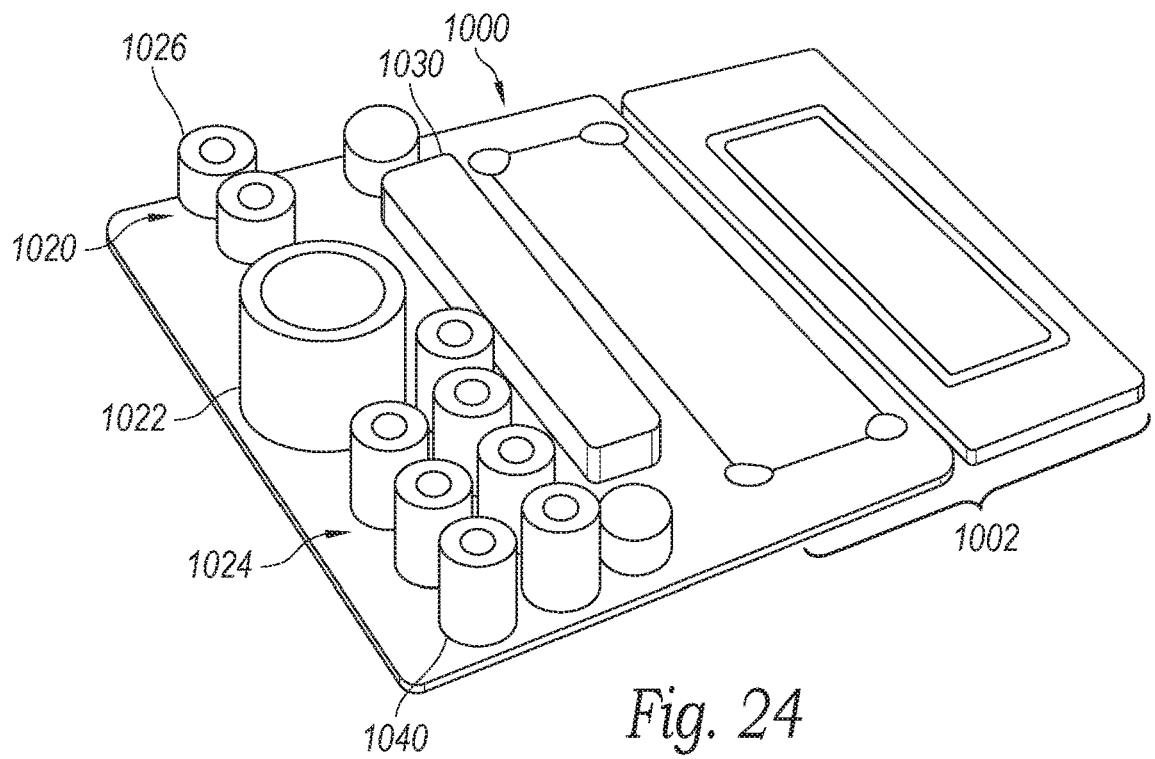
FIG. 24 is a perspective view of a stainer unit in accordance with another embodiment of the technology.

FIG. 24 is a perspective view of a stainer unit in the form of a cartridge 1000 in accordance with another embodiment of technology. The cartridge 1000 can have a flow cell 1002 that is generally similar to the flow cell 352 discussed in connection with FIGS. 5-13. The cartridge 1000 can have an array of actuatable dispensers 1020 for controllably pressurizing and dispensing fluids. The dispensers 1020 can include a bulk dispenser 1022, reagent dispensers 1024, and auxiliary dispensers 1026. Alternatively, the dispenser 1040 can be manually operated. Waste reagents can be collected in a waste reservoir or container 1030.

Figure 25:
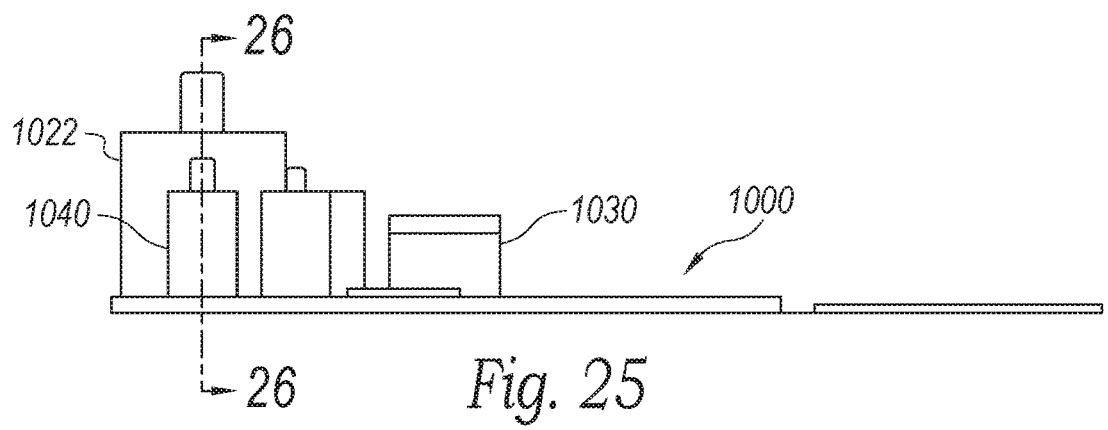
FIG. 25 is a side view of the stainer unit of FIG. 24.
Figure 26:
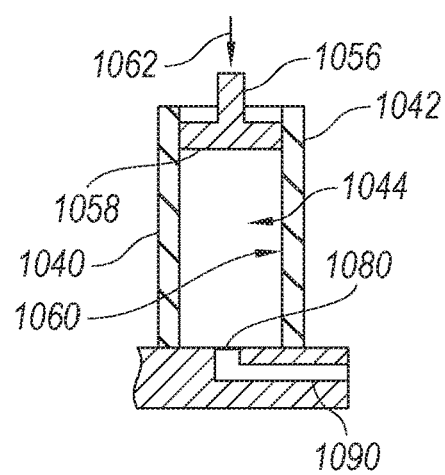
FIG. 26 is a cross-sectional view of a dispenser taken along line 26-26 of FIG. 25.

FIG. 25 is a side view of the cartridge 1000 of FIG. 24. FIG. 26 is a cross-sectional view of a front dispenser 1040 taken along line 26-26 of FIG. 25. Referring now to FIG. 26, the dispenser 1040 can include a main body or cylinder 1042 ("main body 1042") and a plunger 1056 (plungers are shown removed in FIG. 24). The plunger 1056 can be slideably disposed in the main body 1042 and can include a head 1058 configured to sealingly engage a side wall 1060 of the main body 1042. The head 1058 can be made, in whole or in part, of silicon, rubber, plastic, other suitable material for forming a seal (e.g., a fluid-tight seal) with the surface 1060. To dispense fluid, the plunger 1056 can be moved downwardly, as indicated by arrow 1062, to push reagent through a reagent chamber 1044. The dispenser 1040 can be operated by an instrument. For example, an end effector (e.g., end effector 162 of FIG. 2) can press down on the head 156. Once the pressure reaches a sufficiently high level, a frangible element 1080 can be broken to allow the reagent to escape via a passageway 1090. The released reagent can flow into the flow cell to process the specimen.

Figure 27:
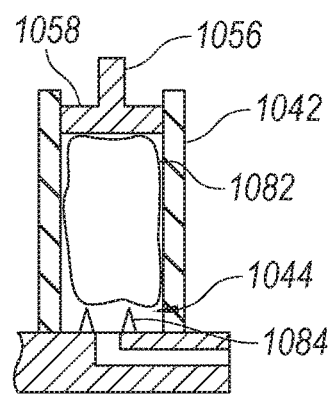
FIG. 27 is a cross-sectional view of a dispenser suitable for the stainer unit of FIG. 24.

FIG. 27 is a cross-sectional view of the dispenser in accordance with another embodiment. The dispenser 1024 can include a main body 1042, a plunger 1056, and a fluid-filled pouch 1080 in a reagent chamber 1044. To dispense fluid, the plunger 1056 can move downwardly and press against the fluid-filled pouch 1082. The fluid-filled pouch 1082 can then contact piercing elements 1084 (one identified), which can cause the fluid to be released. In other embodiments, the plunger can include one or more piercing members that are moved into contact with the pouch to release reagent. Alternatively, the pressure inside of the reservoir 1044 can reach a sufficiently high pressure to burst the pouch 1082. Any number of the dispensers of FIG. 24 can include fluid-filled pouches. Filled or empty pouches can be replaced to provide processing flexibility.

Figure 28:
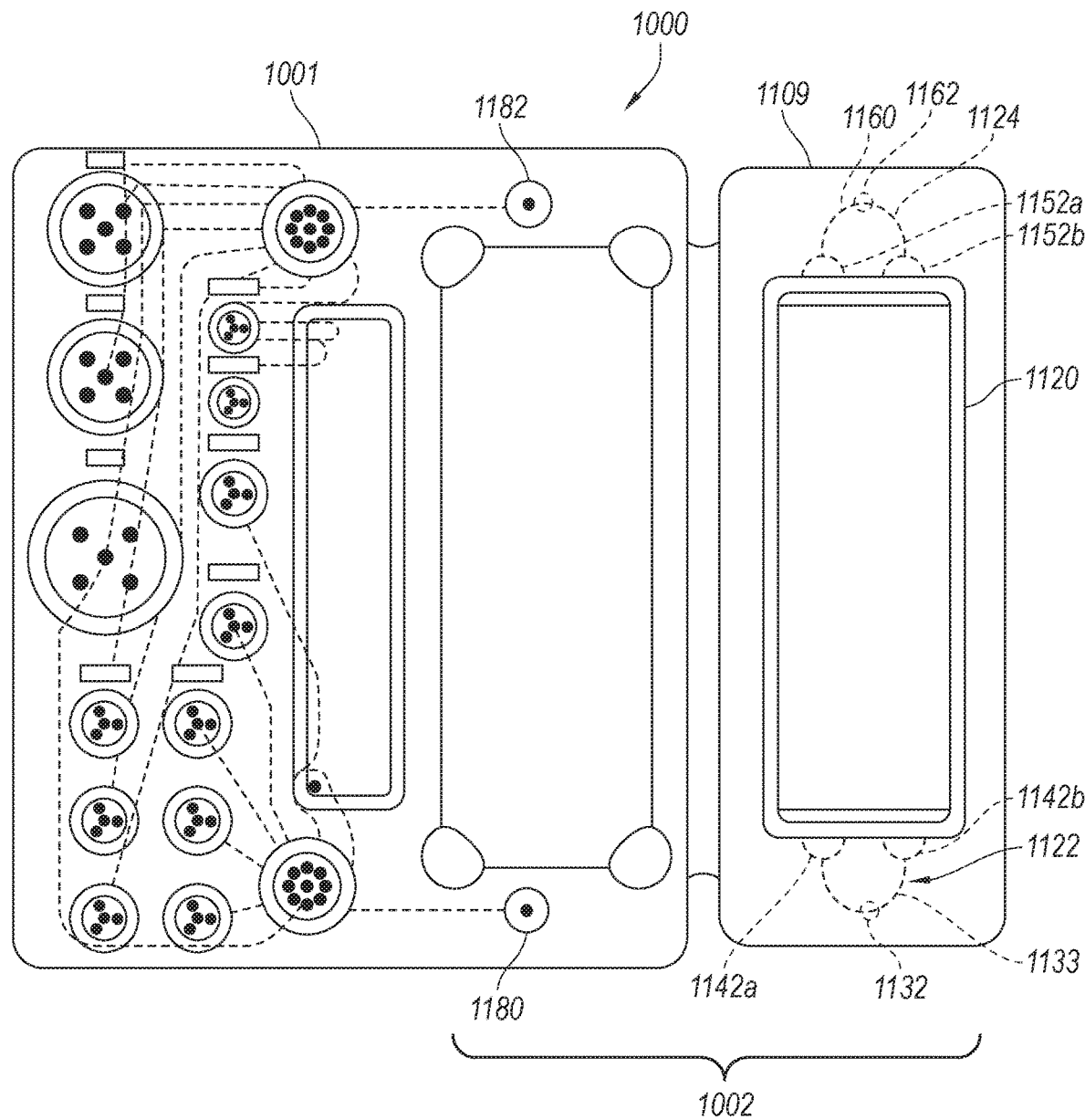
FIG. 28 is a top plan view of the stainer unit in accordance with an embodiment of the technology.

FIG. 28 is a plan view of the cartridge 1000. The cartridge 1000 can include a base 1001 having a fluid circuit with a network of fluid passageways that establish fluid communication between reservoirs 1044 and a flow cell 1002. The flow cell 1002 can include a cover 1109 with a sealing member 1120, an inlet flow network 1122, and an outlet flow network 1124. The inlet flow network 1122 can include an input port 1132, passageways 1133 that branch outwardly from the input port 1132 to spaced apart reaction chamber inlets 1142a, 1142b that help distribute the fluid across the reaction chamber. The distance between the inlets 1142a, 1142b can be selected based on the desired flow distribution through the reaction chamber. The outlet flow network 1124 can include a passageway 1160 that extends from reaction chamber outlets 1152a, 1152b to a cover waste outlet 1162. When the cover 1109 moves to a closed position, the input port 1132 can be brought into fluid communication with the base output port 1180, and the cover waste port 1162 can be brought into fluid communication with a waste port 1182 of the base 1001. The base 1001 can include valves (e.g., entry valves) that can be used to seal the reaction chamber.

Figure 29:
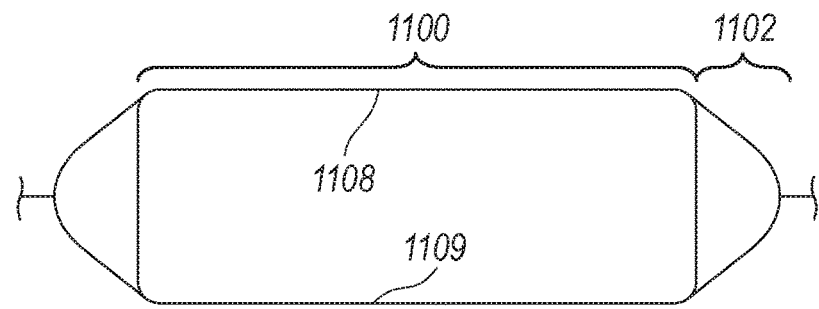
FIGS. 29-32 are top plan views of flow cells in accordance with embodiments of the technology.

FIGS. 29-32 are top schematic views of flow cells in accordance with embodiments of the technology. Referring now to FIG. 29, a substantially rectangular flow cell 1100 can include an inlet region 1102 that expands outwardly to promote laminar fluid flow toward sides 1108, 1109 of the flow cell 1100. Substantially rectangular flow cells are also discussed in connection with FIGS. 9-11, 24, and 28.

Figure 30:
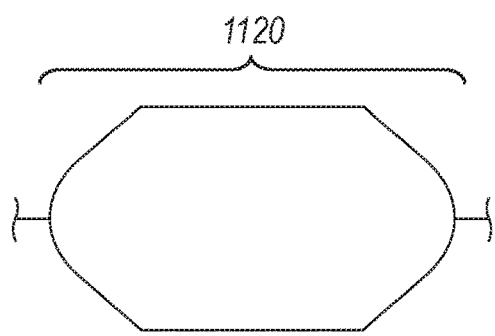

FIG. 30 shows a substantially hexagonal shaped flow cell 1120 that can help promote laminar flow conditions. The inflow rate can be generally equal to 0.5 µl per second, 0.75 µl per second, 1 µl per second, 1.25 µl per second, or 1.5 µl per second with a resident time equal to or less than about 5 seconds, about 10 seconds, about 15 seconds, about 17 seconds, or about 20 seconds, for example. The hexagonal configuration can help reduce the residence time at the upstream region of the flow cell and are also discussed in connection with FIGS. 15-22.

Figure 31:
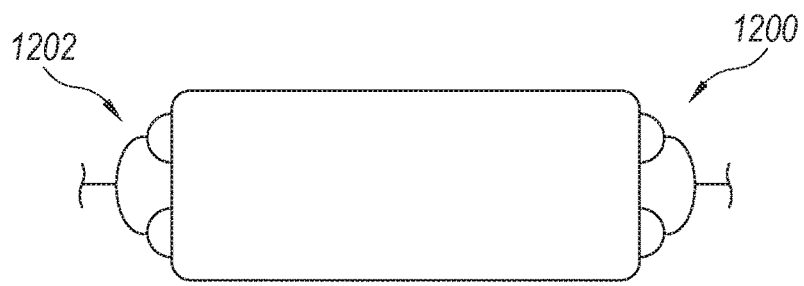
Figure 32:
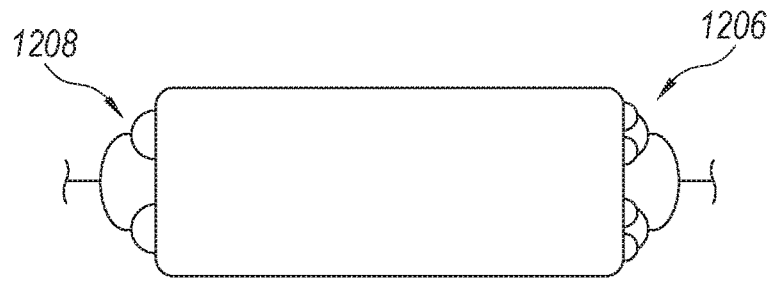

FIGS. 31 and 32 show flow cells with branching inlet channels and branching outlet channels. FIG. 31 shows a network of branching inlet channels 1200 having three junctions and a network of branching outlet channels 1202 having three junctions. FIG. 31 shows a network of branching inlet channels 1206 having six junctions and a network of branching outlet channels 1208 having three junctions. The implementation of multiple output channels provides redundant outflow capability in the event that blockage may occur in any one channel as may be caused by dislodgement of tissue particles, for example. The flow cell's entrance and exit geometries can be selected based on, for example, filling characteristics of the flow cell, complexity of the unit, and/or technical implementation of the functions of the instrument. The number, positions, and configurations of the branches can be selected based on the desired flow characteristics. Additional flow cells can have other substantially polygonal shapes, elliptical shapes, or circular shapes.

From the foregoing, it will be appreciated that specific embodiments of the invention have been described herein for purposes of illustration, but well-known structures and functions have not been shown or described in detail to avoid unnecessarily obscuring the description of at least some embodiments of the invention. The systems, apparatuses, and components described herein can perform a wide range of processes for preparing biological specimens for analysis. The scheduling and methods disclosed herein can be used with different types of specimen processing systems with apparatuses configured to deliver liquid into reaction chamber. In other embodiments, one, multiple, or all of the steps can be performed manually. In some embodiments, a combination of manual steps and automated steps can be performed. PCT Application No. PCT/EP2019/068809 and U.S. Provisional Application No. 62/698,802 are incorporated in reference in their entireties. Where the context permits, singular or plural terms may also include the plural or singular term, respectively. Unless the word "or" is associated with an express clause indicating that the word should be limited to mean only a single item exclusive from the other items in reference to a list of two or more items, then the use of "or" in such a list shall be interpreted as including (a) any single item in the list, (b) all of the items in the list, or (c) any combination of the items in the list. The singular forms "a," "an," and "the" include plural referents unless the context clearly indicates otherwise. Thus, for example, reference to "a specimen" refers to one or more specimens, such as two or more specimens, three or more specimens, or four or more specimens.

The various embodiments described above can be combined to provide further embodiments. The embodiments, features, systems, devices, materials, methods, and techniques described herein may, in certain embodiments, be applied to or used in connection with any one or more of the embodiments, features, systems, devices, materials, methods, and techniques disclosed in the above-mentioned patents and applications. Aspects of the disclosed embodiments can be modified, if necessary, to employ concepts of the various above-mentioned patents, applications, and publications to provide yet further embodiments.

We claim:

1. An automated staining system, comprising:
 a slide processing cartridge including
  a flow cell having a slide-receiving region and a sealing ring, wherein the slide-receiving region is dimensioned to receive a microscope slide, wherein the sealing ring is configured to sealingly contact a specimen-bearing surface of the microscope slide to define a reaction chamber along the specimen-bearing surface,
  a plurality of closed reagent reservoirs,
  at least one dispenser,
  a waste reservoir fluidly coupled to the flow cell,
  at least one thermal element configured to generate thermal energy to heat reagent in the reaction chamber without substantially affecting temperatures of reagents in the plurality of closed reagent reservoirs,
  a fluid circuit in fluid communication with the reaction chamber and including an inlet valve and an outlet valve, wherein the inlet valve and the outlet valve each have an opened state and a closed state, wherein the outlet valve in the closed state prevents reagent flow out of the reaction chamber when a reagent is pressurized in the reaction chamber and heated by the at least one thermal element; and
 an instrument including at least one end effector and a cartridge-receiving station that receives the slide processing cartridge such that the at least one end effector is capable of engaging the at least one dispenser to deliver reagent from a respective one of the reagent reservoirs to the reaction chamber, wherein the instrument is configured to engage the slide processing cartridge and to create positive pressure to cause the reagent to flow from a pipette tip, through the fluid circuit, and into the reaction chamber such that the positive pressure pressurizes the reaction chamber to substantially raise a boiling point of the reagent contained within the reaction chamber.

2. The automated staining system of claim 1, wherein the inlet valve and the outlet valve are operable to allow the reagent to be delivered to the reaction chamber and to inhibit the flow of the reagent out of the reaction chamber.

3. The automated staining system of claim 1, wherein the at least one dispenser is configured to sequentially deliver reagents from the closed reagent reservoirs to the flow cell for fluid exchange cycles and to cause the reagents to flow from the reaction chamber to the waste reservoir.

4. The automated staining system of claim 1, wherein the instrument is configured to use the slide processing cartridge to perform a staining protocol without directly contacting the reagent that are delivered to the reaction chamber.

5. The automated staining system of claim 1, wherein the closed reagent reservoirs contain reagents for performing a single multi-step staining protocol.

6. The automated staining system of claim 1, wherein after processing a specimen on the specimen-bearing surface, most of the reagent, by volume, from one of the closed reagent reservoirs is contained in the waste reservoir.

7. The automated staining system of claim 1, wherein the slide processing cartridge includes a fluid circuit that fluidly couples the closed reagent reservoirs to the reaction chamber and fluidly couples the reaction chamber to the waste reservoir.

8. The automated staining system of claim 1, wherein the instrument includes a controller programmed to
 receive information for processing the microscope slide; and
 perform a process for staining a tissue specimen located within the reaction chamber based on the received information.

9. The automated staining system of claim 1, wherein the waste reservoir is configured to contain waste reagents, which have passed through the reaction chamber, and to hold the waste reagents after the slide processing cartridge is removed from the cartridge-receiving station.

10. The automated staining system of claim 1, wherein the slide-receiving region includes a tissue-receiving area surrounded by the sealing ring.

11. The automated staining system of claim 1, wherein the slide-receiving region includes one or more thermal elements configured to heat and/or cool the microscope slide.

12. The automated staining system of claim 1, wherein the reaction chamber has a substantially hexagonal shape.

13. The automated staining system of claim 1, wherein the reaction chamber has an inlet region and a specimen region, wherein the inlet region widens laterally in a downstream direction to allow a flow of the reagent to spread outwardly.

14. The automated staining system of claim 1, wherein the slide-receiving region includes a cover movable from an open position for loading the microscope slide onto the slide processing cartridge and a closed position for sealingly contacting the specimen-bearing surface of the microscope slide.

15. The automated staining system of claim 14, wherein the cover includes the sealing ring and an integrated coverslip.

16. The automated staining system of claim 1, wherein the at least one dispenser includes one or more pipette tips.

17. The automated staining system of claim 1, wherein the slide processing cartridge includes
 a tray with the plurality of reagent reservoirs, and
 a cover removably coupled to the tray and covering each of the reagent reservoirs.

18. A microfluidic microscope slide processing cartridge, comprising:
 a support base;
 a flow cell connected to the support base and including
  a slide engagement region having a surface,
  a sealing member configured to sealingly contact a specimen-bearing surface of a microscope slide to define an anti-boiling high-temperature flow chamber between the surface of the slide engagement region and the specimen-bearing surface, and
  a fluid circuit in fluid communication with the anti-boiling high-temperature flow chamber and including an outlet valve having an opened state and a closed state, wherein the outlet valve in the open state allows reagent flow through the anti-boiling high-temperature flow chamber;

a plurality of reagent reservoirs supported by the support base;

at least one dispenser; and an instrument including at least one end effector operable to deliver a reagent from each of the reagent reservoirs to the anti-boiling high-temperature flow chamber, wherein the instrument is configured to create positive pressure to cause the reagent to flow from a pipette tip, through the fluid circuit, and into the anti-boiling high-temperature flow chamber such that the positive pressure pressurizes the anti-boiling high-temperature flow chamber to substantially raise a boiling point of the delivered reagent(s) for a staining period.

19. The microfluidic microscope slide processing cartridge of claim 18, wherein the at least one dispenser is configured for fluid communication with the flow cell to perform a staining protocol in which the microfluidic microscope slide processing cartridge contains reagents throughout the staining protocol.

20. The microfluidic microscope slide processing cartridge of claim 18, further comprising a waste container supported by the support base and fluidically coupled to the flow cell such that the waste container receives and contains the reagent(s) from the flow chamber.

21. The microfluidic microscope slide processing cartridge of claim 18, further comprising:

a waste container in fluid communication with the flow cell and detachably coupled to the support base, the waste container including a waste chamber that is sealed to hold waste reagent(s) after the waste container has been detached from the support base; and a one-way valve that allows the waste reagent(s) to flow into the waste chamber.

22. The microfluidic microscope slide processing cartridge of claim 18, further comprising:

a waste container in fluid communication with the flow cell and detachably coupled to the support base, which carries the flow cell and the plurality of reagent reservoirs, wherein the waste container is configured to be detached from the support base while the microscope slide is positioned at the slide engagement region.

23. The microfluidic microscope slide processing cartridge of claim 18, further comprising:

a tray with the plurality of reagent reservoirs, and a cover removably coupled to the tray to close the reagent reservoirs.

24. The microfluidic microscope slide processing cartridge of claim 18, wherein the slide engagement region includes a cover movable from an open position for loading the microscope slide onto the slide engagement region and a closed position for sealingly contacting the specimen-bearing surface of the microscope slide.

25. The microfluidic microscope slide processing cartridge of claim 18, wherein each of the reagent reservoirs contains a respective reagent-filled pouch, and the at least one dispenser includes a plurality of plungers each movable to cause a respective one of the reagent-filled pouches to release the reagent.

\* \* \* \* \*